US005681434A

United States Patent [19]
Eastlund

[11] Patent Number: 5,681,434
[45] Date of Patent: Oct. 28, 1997

[54] METHOD AND APPARATUS FOR IONIZING ALL THE ELEMENTS IN A COMPLEX SUBSTANCE SUCH AS RADIOACTIVE WASTE AND SEPARATING SOME OF THE ELEMENTS FROM THE OTHER ELEMENTS

[76] Inventor: Bernard John Eastlund, 6615 Chancellor Dr., Spring, Tex. 77379

[21] Appl. No.: 612,240

[22] Filed: Mar. 7, 1996

[51] Int. Cl.⁶ ..................................................... C25B 5/00
[52] U.S. Cl. .................... 204/156; 588/237; 250/282; 250/298; 75/10.2; 422/186.04; 422/906
[58] Field of Search .................................. 204/164, 156; 588/237; 250/282, 298; 75/10.2; 422/186.04, 906

[56] References Cited

U.S. PATENT DOCUMENTS

| | | | |
|---|---|---|---|
| 3,845,300 | 10/1974 | Roehling et al. | 250/282 |
| 3,893,845 | 7/1975 | Mahaffey et al. | 204/164 |
| 3,942,975 | 3/1976 | Drummond | 204/164 |
| 4,059,761 | 11/1977 | Dawson | 250/290 |
| 4,066,893 | 1/1978 | Dawson | 250/282 |
| 4,081,677 | 3/1978 | Dawson | 250/290 |

OTHER PUBLICATIONS

Jun. 1995, Radioactive Waste Tank Remidiation Focus Area, DOE Office of Envrionmental Mgmt, pp. 1–53.
Oct. 1992, Hoffelner et al, Plasma Technology For Rapid Oxidation Melting & Vitrification of Low/Medium Level Radioactive Waste, Nuclear Engineering International, pp. 14–16.
No Month Available, 1994, Lieberman & Herman, Princples of Plasma Discharge Processing, Wiley–Interscience New York, NY, pp. 1–22.
Sep. 1988, Herman, Plasma Spray Coatings, Scientific American pp. 112–115.
Jun. 1989, Holusha, Putting a Torch to Toxic Wastes, New York Times.
May 1969, Eastlund & Gough, The Fusion Torch–Closing The Cycle From Use to Reuse, WASH–1132 US AEC.
Dec. 1991, Eastlund & Gough, Near Term Recycling Option Using Fusion Grade Plasmas, Fusion Technology vol. 20, pp. 987–991.
No Month Available, 1982, Dolan, Fusion Research, Pergamon Press, New York, NY, pp. 168–173.
Feb. 1971, Gough & Eastlund, Prospects of Fusion Power, Scientific American, pp. 50–64.
Sep. 1995, Furth, Fusion, Scientific American, pp. 174–176.
No Month Available, 1984, Post et al, Physics of Plasma Wall Interactions In Controlled Fusion, NATO ASI Series Series B: Physics vol. 131 Plenum Press, NY, pp. 1–39 and 855–945.
No Month Available, 1994, Strachan et al, Wall Conditioning Experiments Using Impurity Pellet Injection, J. of Nuclear Materials 217, pp. 145–153.
Jun. 1976, Various Texas Experimental Tokamak, Un. of Texas Austin, Texas.
Jul. 1993, Combs, Pellet Injection Technology, Rev. Sci. Instruments vol. 41, No. 7, pp. 1679–1698.

(List continued on next page.)

*Primary Examiner*—Kathryn L. Gorgos
*Assistant Examiner*—Kishor Mayekar

[57] ABSTRACT

This invention provides methods and apparatus for ionizing all the elements in a complex substance such as radioactive waste and for separation of some of the elements from the other elements. One principal methods utilizes plasma confinement by toroidal magnetic fields as a gate to regulate when and where specific elements are collected. While the plasma is confined, some of the species are removed by repeatedly cycling all of the species between the plasma and the deposition stages lining the walls, whereby some species preferentially accumulate on the deposition stages. The other species are then diverted into an additional containment vessel for collection or additional separations. The apparatus is a large volume plasma processor with multiple containment vessels. The invention provides for the characterization of waste material, and for its separation all within one serf contained vacuum environment. Other applications include remediation of chemical toxic wastes and chemical and germ warfare weapons.

22 Claims, 21 Drawing Sheets

OTHER PUBLICATIONS

No Month Available, 1993, McNeil, Pyrolysis in Tokamak Plasmas, Industrial Applications of Plasma Physics ISPP-13 SIF, Bologna, pp. 483-488.

May 1991, McCool, An Assessment of the Feasibility of Fueling A Tokamak Reactor With LT Pellets, University of Texas Research Report FRCR #389.

No Month Available, 1993, Van Houtte, One Minute Pulse Operation in the Tore Supra, Nuclear Fusion vol.33, No. 1.

No Month Available, 1992, Various Laboratory Characterization of Samples Taken in May 1991 From Hanford Waste Tank 241-SY-101, Westinghouse Hanford Company WHC-SD-WM-DTR-024.

Oct. 1989, Mellon et al, Technical & Project Highlights for th Defense Waste Processing Facility, Proceedings of the 1989 Joint Int'l Waste Mgmt Conf Kyoto, Japan.

Apr. 1993, Venneri et al, Accelerator-Driven Transmutation of Waste, Los Alamos.

Sep. 1987, Ehrardt et al, Collisional Processes of Hydrocarbons in Hydrogen Plasmas, PPPL-2477 Princeton University.

No Month Available, 1968, Schmidt et al, Alkali Metal Purification by Contact Ionization, Physics of Fluids pp. 4919-4920.

No Month Available, 1995, T. Shoji et al, New Method to Improve He-Removal Peformance of Pump Limiter by RF Ponderomotive Force, J. of Nuclear Materials, 220-222, pp. 483-487.

No Month Available, 1993, Finken et al, Plasma Performance Of TEXTOR After Pellet Injection, Fusion Technology and Plasmas, North Holland, NY I-131/I-132.

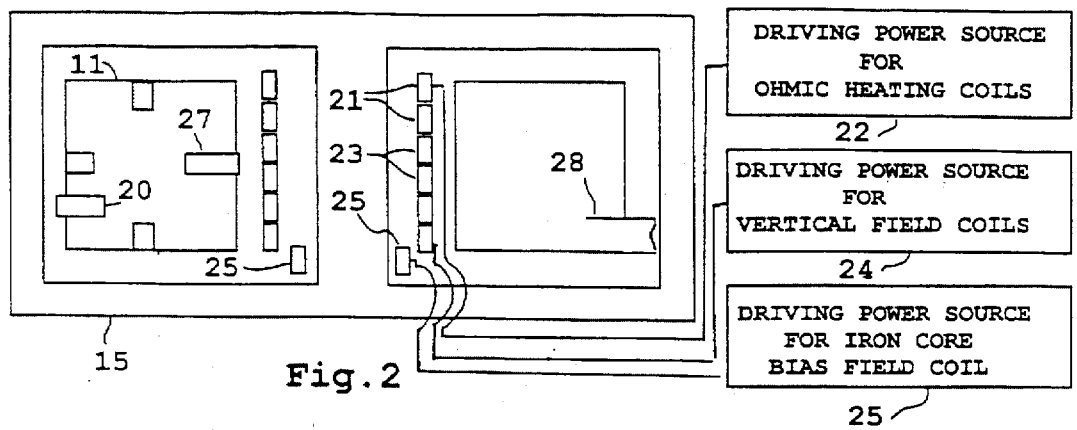
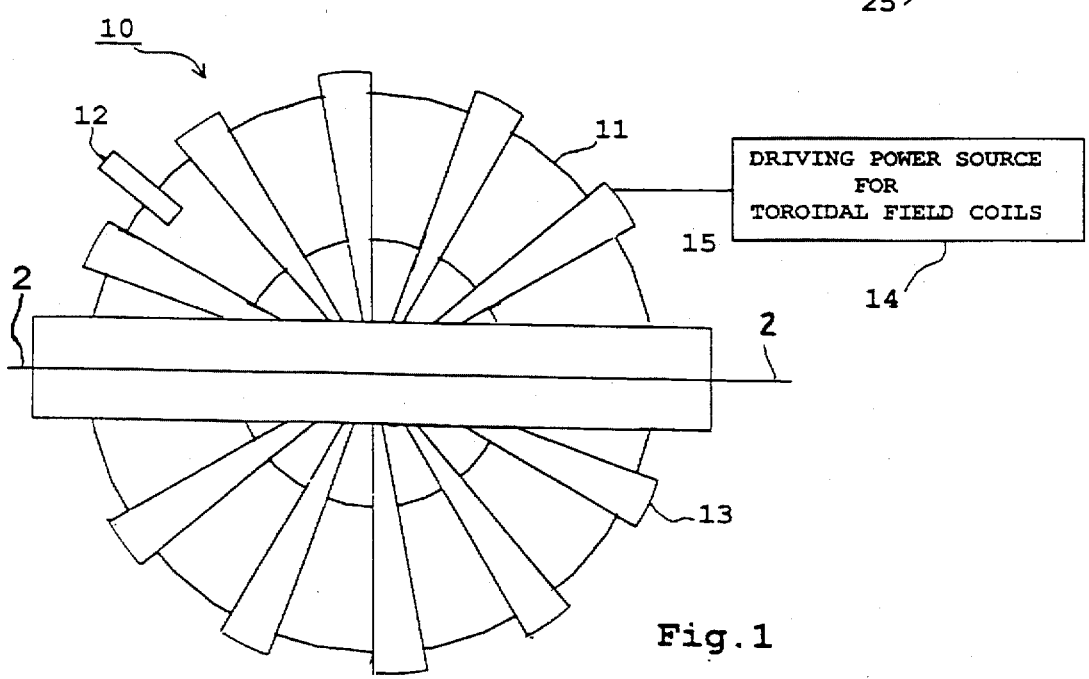

CURRENT 190
201
TIME

LOOP VOLTAGE 190
200
TIME

DENSITY 190
202
TIME

ELECTRON TEMPERATURE 190
203
TIME

CURRENT

TIME

LOOP VOLTAGE 191
190
TIME

DENSITY 192
190
TIME

ELECTRON TEMPERATURE 190
193
TIME

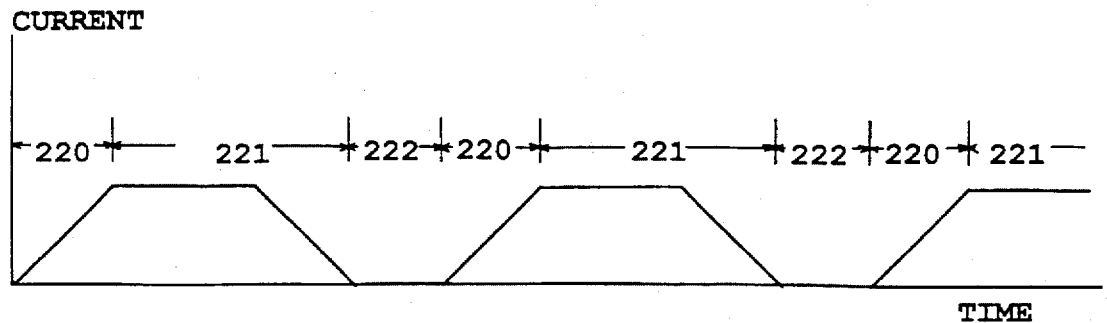
Fig.22
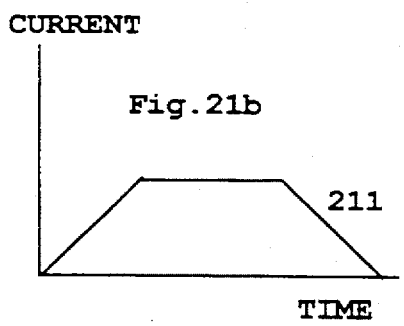
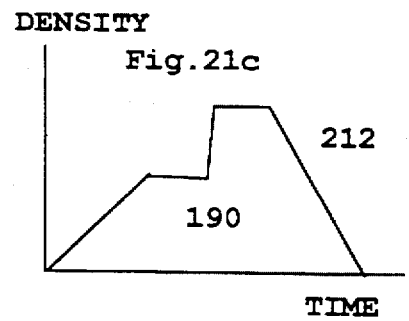
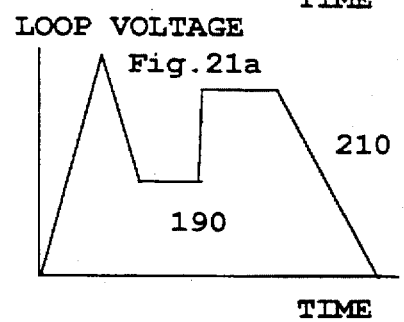
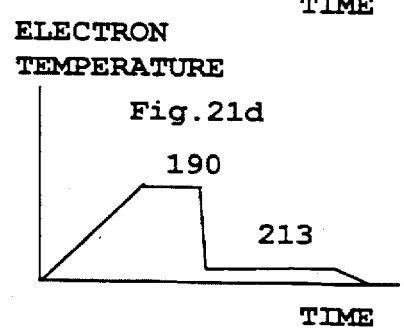

METHOD AND APPARATUS FOR IONIZING ALL THE ELEMENTS IN A COMPLEX SUBSTANCE SUCH AS RADIOACTIVE WASTE AND SEPARATING SOME OF THE ELEMENTS FROM THE OTHER ELEMENTS

DESCRIPTION

1. Technical Field

This invention relates to a plasma processor which is a species separation device that converts substances included in toxic materials such as nuclear wastes or chemical warfare agents into a fully ionized plasma and separates from each other a portion of species of elements from the other species of elements and collects them on deposition stages.

2. Background Art

High level nuclear waste tank remediation is a severe problem because hundreds of storage tanks located at Hanford, and at Savannah River have been used to process and store radioactive and mixed waste generated from weapons material production. The waste takes several forms including sludge, solids and liquids. Complex chemicals include nitrate and nitrate salts, hydrated metal oxides, phosphate precipitate and ferrocyanides. The radioactive species include the actenides and fission fragments. This material is not only difficult to handle, it is difficult to characterize initially before remediation efforts can even begin. Retrieval and conveyance to processing apparatus is a problem. Separation of species of elements one from the other is a complex task and one in which existing chemical and high temperature plasma torch based technologies can create additional problems due to contamination and emissions associated with the process streams. See for example, "Radioactive Waste Tank Remediation Focus Area", Technology Summary, DOE Office of Environmental Management, Jun., 1995.

Arc plasma torches have been applied to low level nuclear wastes derived from maintenance work at nuclear power stations, hospitals and Research and Development facilities. These plasma torch systems include filters to scrub radionuclides and particulates containing radionuclides and are subject to upsets that can require extensive cleaning and refurbishing. The problem arises partly because plasma torches are unable to completely convert solids into gaseous ionized states. See for example, "Plasma Technology for Rapid Oxidation, Melting, and Vitrification of Low/Medium Level Radioactive Waste", W. Hoffelner et al, Nuclear Engineering International, Oct., 1992.

Plasma torches operate from 5,000 to about 15,000 degrees Celsius and pressures of 100 torr to 3000 torr or more. For a more detailed understanding of the inability of the technology of commercial plasma torches to completely vaporize and ionize solids see "Plasma Spray Coatings", Herman, Scientific American, Sept. 1988 and "A Quarter of a Century of Plasma Spraying", Zaat, in "Annual Review of Materials Science," Huggins, Bube and Vermilyea, Annual Reviews Inc., Palo Alto, Calif., Vol. 13, 1988.

Westinghouse has been a prime leader in applying plasma torches to toxic wastes. See for example, "Putting a Torch to Toxic Wastes", by John Holusha, New York Times. Jun. 21, 1989. Again, these plasma torch systems include filters to scrub particulates and are subject to upsets that can require extensive cleaning and refurbishing.

A theoretical concept described as "The Fusion Torch" has been proposed by the inventor to use the high energy flux plasmas typical of controlled fusion research devices as a "universal solvent" to vaporize, dissociate and ionize any substance. See for example, "The Fusion Torch-Closing the Cycle From Use to ReUse", by Bernard J. Eastlund and William C. Gough, WASH-1132, U.S.A. E. C., May 15, 1969 and "Near Term Recycling Options Using Fusion-Grade Plasmas", Eastlund and Gough, Fusion Technology, December, 1991. These papers, and other papers on the "Fusion Torch" cited in these references were in general terms, did not address high atomic number radiation loss containment problems and did not specify how to build such devices for separation purposes.

Boeing Company, Seattle, Wash. initiated studies on separation of one species, aluminum, from other species, oxygen and silicon in aluminum ore as a result of a lecture given at Boeing Research Labs by Bernard J. Eastlund in 1970, and received a patent entitled "Method and Apparatus for Reducing Matter to Constituent Elements and Separating One of the Elements from the Other Elements," by James E. Drummond, U.S. Pat. No. 3,942,975, Mar. 9, 1976. This method was not pursued because the apparatus could not reliably convert all the solid particulates into ionized gas plasma and because the density was too high for separations to occur without interference from multiple collisions.

TRW Inc. of Redondo Beach, Calif. received three patents relating to the separation of one species of isotopes of elements from other species of isotopes of elements. These patents are "Separation of Isotopes by Time of Flight", John Dawson, U.S. Pat. No. 4,059,761, Nov. 22, 1977; "Isotope Separation by Magnetic Fields", John Dawson, U.S. Pat. No. 4,081,677; and "Isotope Separation by Ion Waves", U.S. Pat. No. 4,066,893, by John Dawson, Jan. 3, 1978. These devices were built and tested but were found to be limited by plasma instabilities that debated efforts to collect the separated species efficiently. Also, the devices were limited to working with gaseous feed materials and could not utilize solids.

For a brief description of controlled fusion research devices, see "Fusion Research", Dolan, Pergamon Press, New York, N.Y., 1982. This, and other similar articles and books on fusion research are written with emphasis on the physics necessary to achieve electricity producing controlled fusion devices and do not emphasize specific descriptions of how to build such devices for process applications To operate properly, the Tokamak research devices that have been built need to prevent high atomic number atoms, such as atoms of tungsten, molybdenum and iron from sputtering from containment vessel walls and radiating away the power applied to heat the plasma. See, "The Prospects of Fusion Power", W. C. Gough and B. J. Eastlund, Scientific American, Feb. 1971, and "Fusion", Furth, Scientific American, Sept. 1995. Plasma processing techniques using gas phase feedstock have been used to clean the vacuum chamber walls and to deposit coatings of low atomic number (Z) materials such as boron, carbon, lithium and silicon on all parts exposed to the high temperature plasmas produced in such devices. For example, see "Physics of Plasma-Wall Interactions in Controlled Fusion", Post et al, NATO ASI Series, Series B: Physics Vol. 131, Plenum Press, N.Y., 1984.

Solid materials injected into the high energy flux research plasmas have been used as feedstock for similarly coating the walls. Wall coatings have been successfully achieved with pellets of low atomic number elements such as lithium, lithium deuteride, boron and carbon. The carbon pellets have been difficult to use because they can occasionally cause the high energy flux research plasmas to become unstable and extinguish. See for example, "Wall Conditioning Experiments on TFTR Using Impurity Pellet Injection", Strachan et al., Journal of Nuclear Materials 217, 145–153, 1994. Pellets of tungsten, molybdenum and other high Z materials immediately extinguish the plasmas in Tokamak devices as presently built and operated. For descriptions of how to build a Tokamak device, see "The Texas Experimental Tokamak, A Fusion Plasma Research Facility", Proposal to The Energy Research and Development Administration, by The Fusion Research Center of the University of Texas at Austin, Jun., 1976.

A paper has appeared in which a Tokamak fusion research device was suggested as a means of pyrolysis of toxic wastes, but, like "The Fusion Torch", this work did not address key issues of how to construct a device that could handle disruptions caused by toxic materials with high Z content. See "Pyrolysis in Tokamak Plasmas", McNeil, Industrial Applications of Plasma Physics, ISPP-13, edited by Bonizzoni, Hooke and Sindoni, SIF, Bologna, 1993.

Thus, present technologies for remediation of toxic or radioactive wastes are limited by problems associated with the complexity and inhomogeneity of the substances and by contamination and emissions associated with process streams, especially as a consequence of malfunctions. The waste tanks at Hanford are so dangerous and difficult to deal with, that it is a major problem to identify or characterize the waste materials in sufficient detail to facilitate conventional remediation steps. The plasma torch approaches to date are limited in ability to handle substances with high atomic numbers.

DISCLOSURE OF INVENTION

This invention has been made in order to solve problems associated with remediation of toxic or radioactive waste tanks. In particular, it provides a means of using the high temperature plasma of a large volume plasma processor to ionize any feedstock material such as radioactive wastes and for separation of some of the elements from the other elements. The invention allows real time characterization of the elemental constituants of the waste, separates the most dangerous radioactive elements from the benign elements of the waste, and minimizes residual contaminant release by carrying out all processing within a closed vacuum environment. The principal object of this invention is to provide three principal novel methods of separating from each other a portion of species from the other species in any feedstock material, such as radioactive wastes. For further description of the Large Volume Plasma Processor see the U.S. Pat. No. 5,630,880 entitled "Method and Apparatus for a Large Volume Plasma Processor That Can Ionize Any Material" by Bernard John Eastlund, submitted simultaneously with this patent application.

One principal method in accordance with this invention is to utilize a large volume plasma processor to separate some of the elements from the other elements in a series of seven steps. The first step is to generate a product plasma that is composed principally of the ionized and unionized species of elements of the feedstock material by means of injecting the feedstock material, such as radioactive wastes into a large volume plasma processor equipped with a toroidal containment vessel and with at least one additional containment vessel. The second step is to maintain the product plasma spaced from the toroidal containment vessel walls by means of magnetic fields for the period of time over which the ionized and unionized species of elements of the feedstock material in the center of the plasma diffuses to the surface of the plasma. Next a first portion of the species is separated from the other species by repeatedly cycling all of the species of the product plasma between the plasma surface and deposition stages lining the toroidal containment vessel walls, whereby a portion of the elements which have high ionization probabilities, such as metals, preferentially accumulate on the deposition stages, while other species such as oxygen, nitrogen and hydrogen, which have lower ionization probabilities accumulate in the remainder of the confined product plasma.

The fourth step is to divert the remainder of the species of the product plasma, containing species such as oxygen, nitrogen and hydrogen into the additional containment vessel at the end of the time over which the ionized and unionized species of elements of the feedstock material from the center of the plasma diffuse to the plasma surface. The fifth step is to cause these remaining species to move for an additional period of time along the parallel magnetic fields of the additional containment vessel. The sixth step is to collect the species moving along the additional containment vessel as they cool and recombine and land on the deposition stages lining the walls of the additional containment vessel. The seventh and final step is to remove the deposition stages with the collected material from the large volume plasma processor.

Another object of this invention is a method of separating the species of elements from each other on the basis of their differential sputtering rates with specially prepared materials.

Another object of this invention is a method of separating the species of elements from each other on the basis of their differential physisorption and chemisorption rates of interaction with specially prepared materials.

A second principal method in accordance with this invention differs from the first principal method by carrying out the separation of the species of elements from each other entirely in an additional confinement vessel The crucial step of this method is to separate the species of elements from each other based on their differences in ionization potential.

Another object of this invention is a method of separating the species of elements from each other on the basis of their differences in charge exchange cross sections with different atomic and molecular species.

Another object of this invention is a means of separating the species of elements from each other on the basis of their differences in charge to mass ratios.

Another object of this invention is a means of separating the species of elements from each other on the basis of their difference in attachment to ceramic, glass or other non-metallic beads.

A third principal method in accordance with this invention utilizes spectrometer obtained information that identifies the species and their spatial location in the product plasma to make decisions to divert the identified species into at least one of more than one additional containment vessels, one of which has means to separate the species from each other of high level nuclear waste and the other has means to separate the species from each other of low level nuclear waste.

These methods provide a unique new method for characterization, separation and preparation for either permanant storage or transmutation of high level nuclear wastes.

Another object of this invention is to provide a novel large volume plasma processor apparatus for converting any feedstock material, such as high level nuclear waste, into a product plasma composed of the species of elements in the feedstock material Another object of this invention is to provide additional confinement vessels and means to divert the product plasma into those vessels.

Another object of this invention is to provide apparatus in the additional confinement vessels with means for heating the plasma with electromagnetic wave heaters, with rf ponderomotive force applicators, with atomic and molecular beam projectors and with bead projectors.

This invention is a unique new method and apparatus for characterization, separation and preparation for either permanant storage or transmutation of high level nuclear wastes. The methods described herein can be used for reactor fuel element reprocessing, for elimination of chemical toxic wastes and can eliminate chemical or germ warfare weapons.

Other objects, features, and advantages of the invention will be apparent from the drawings, from the specifications and embodiments, and the claims,

BRIEF DESCRIPTION OF THE DRAWINGS

The actual construction, operation and apparant advantages of this invention will be better understood by referring to the drawings in which like numerals identify like parts and in which:

FIG. 1 is a top view, partly in blocks, showing the construction details of a large volume plasma processor.

FIG. 2 is a cross section, partly in blocks, through the line 2 in FIG. 1, that shows internal construction details of the large volume plasma processor.

in FIG. 10.

FIG. 21a is a waveform diagram showing the time dependence of loop voltage during high atomic number pellet injection with stabilization.

FIG. 21b is a waveform diagram showing the time dependence of electric current during high atomic number pellet injection with stabilization.

FIG. 21c is a waveform diagram showing the time dependence of electron number density during high atomic number pellet injection with stabilization.

FIG. 21d is a waveform diagram showing the time dependence of electron temperature during high atomic number pellet injection with stabilization.

FIG. 22 is a waveform diagram for repetitively pulsed operation.

PREFERRED EMBODIMENTS OF THE INVENTION

Figure 4:
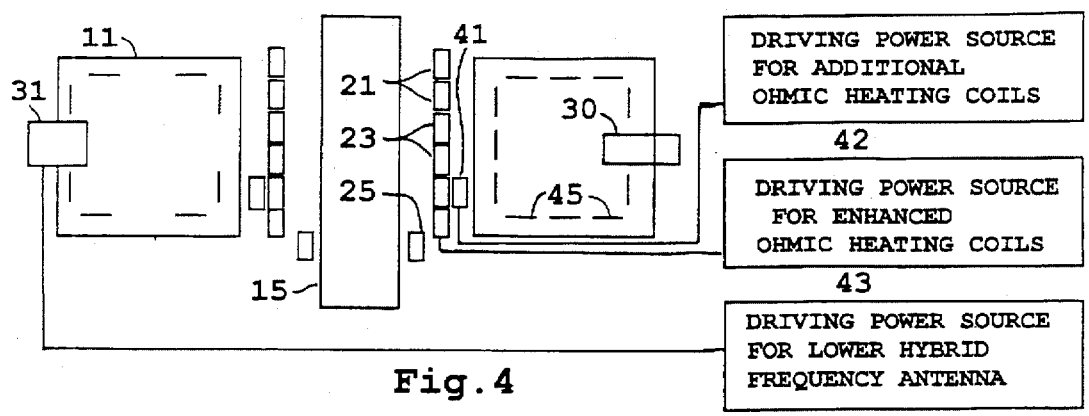
FIG. 4 is a cross section, partly in blocks, through the line 3 in FIG. 3, that shows additional construction details of the large volume plasma processor.

Now, embodiments of this invention will be described in detail with reference to the accompanying drawings.

FIGS. 1 and FIG. 2 describe the system components required to build a large volume plasma processor that can generate a product plasma composed principally of the ionized and unionized species of elements of any feedstock material such as uncharacterized high level nuclear waste.

FIG. 1 is a top view, partly in blocks, that shows construction details of a large volume plasma processor that produces a high temperature, low density plasma with a high energy flux that is called a process plasma. comprising a process plasma generation portion 10 with a toroidal containment vessel 11, a gas inlet 12 for supplying a generating gas, such as hydrogen, helium or neon, for the generation of the process plasma, toroidal magnetic field generation cells 13, a driving power source 14 for the toroidal field generation coils, an iron core yoke 15 to link the current in the ohmic heating cells with the toroidal current in the toroidal containment vessel.

FIG. 2 is a cross section, partly in blocks, through the line 2 in FIG. 1, that shows internal construction details of the large volume plasma processor, with a plasma ignitor 20, ohmic heating cells 21 for heating the process plasma, a driving power source 22 for the ohmic heating cells, vertical field coils 23 for positioning the process plasma within the toroidal containment vessel 11, a driving power source 24 for the vertical field coils, iron core bias field cells 25, a driving power source 26 for the iron core bias field coils, limiters 27 to define the shape of the high energy flux plasma, and an exhaust pipe 28.

Figure 3:
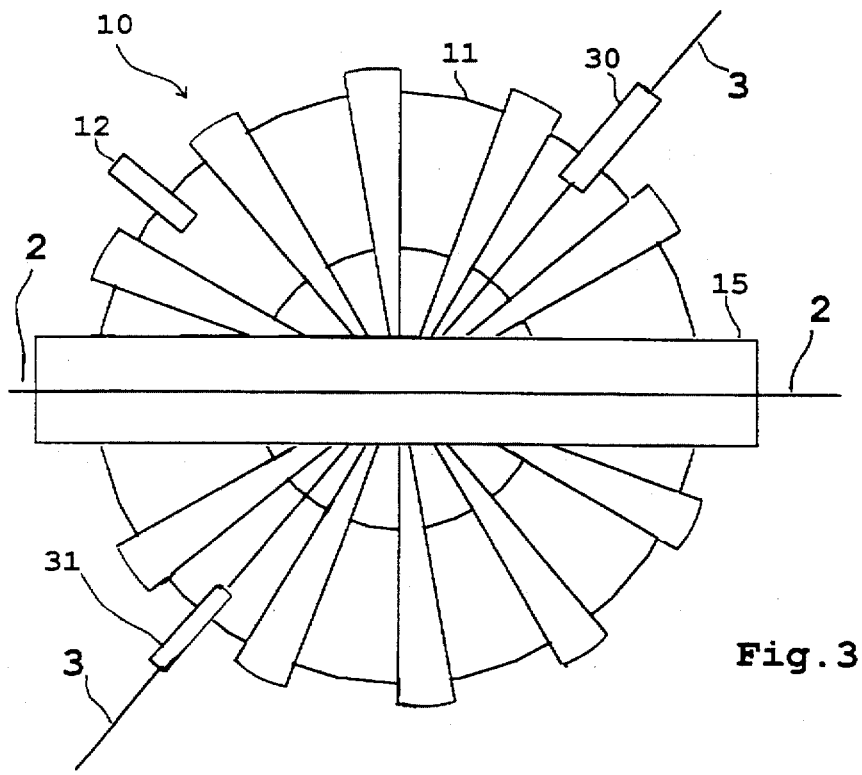
FIG. 3 is a top view, partly in blocks, that shows an injector portion and an antenna attached to the large volume plasma processor.

FIG. 3 and FIG. 4 describe the system components that are used to inject feedstock material and to heat and stabilize the interacting mixture of process plasma and feedstock material, referred to as the "combination plasma" in the disclosure above.

FIG. 3 is a top view, partly in blocks, that shows an injector portion 30 and an antenna 31 attached to the toroidal containment vessel 11.

FIG. 4 is a cross section, partly in blocks, through the line 3 in FIG. 3, that shows internal details that include additional ohmic heating coils 41, driving power source 42 for the additional ohmic heating coils, enhanced driving power source 43 for the ohmic heating coils 15, an antenna 31 and a driving power source 44 which is a lower hybrid frequency generator for the antenna 31 and deposition stages 45.

By way of example, a set of typical parameters for component sizes and power supplies suitable for a pulsed mode of operation are described in detail.

The typical dimensions for the toroidal containment vessel 11 of FIG. 1 are a major radius, $R_M$, of 100 cm and a minor radius, $r_m$, of about 50 cm. A typical material for the containment vessel 11 is stainless steel with a ceramic gap to allow transient magnetic fields to enter the containment vessel. The cross section of the toroidal containment vessel can be square as shown in FIG. 2, in which case $r_m$ is a mean of the dimensions. The cross section can be circular, octaganal or any continuous shape.

The toroidal magnetic field generation coils 13 as shown in FIG. 1 are made with 6 turns of copper wire that have a resistance of 1.2 milliohms and an inductance of 2 millihenry's. The outer dimensions of each coil are 150 cm×150 cm×90 cm. The bore is a rectangle with dimensions of 80 cm×90 cm.

Figure 5:
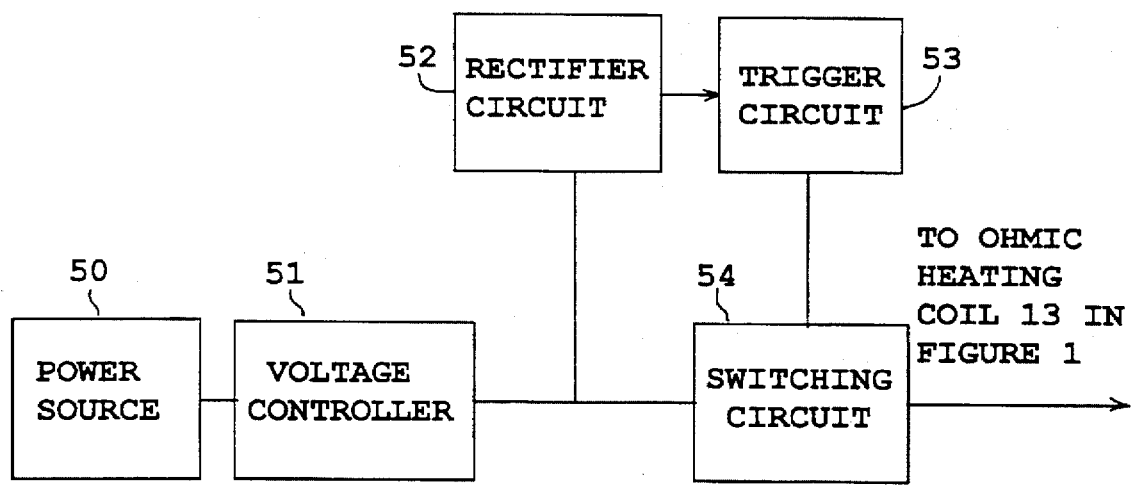
FIG. 5 is a detailed block diagram of a driving power source for the toroidal field coils shown in FIG. 1.

A detailed block diagram of the driving power source 14 for the toroidal field coils is shown in FIG. 5. By way of example, this driving power source for the toroidal field coils is constructed with a power source 50 of 500 volts with single phase current capability of 157 kiloamperes, with a total power capability of 65 Megawatts, a voltage controller 52 which controls the output power of the power source 50, a rectifier circuit 52, which rectifies the controlled output current, a trigger circuit 53, which generates firing signals, and a switching circuit 54 to turn the system on and off.

The ohmic heating coils 21 of FIG. 4 are made with copper coils of from 90 to 180 cm in diameter with conducting cross sections of about 2×5 cm.

Figure 6:
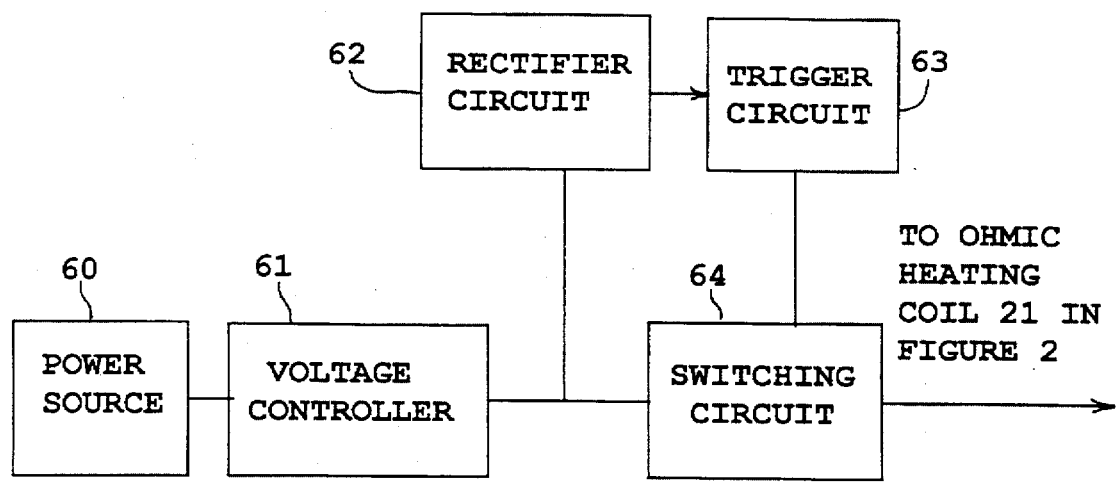
FIG. 6 is a detailed block diagram of a driving power source for the ohmic heating coils shown in FIG. 1.

A detailed block diagram of the driving power source 22 for the ohmic heating coils 21 of FIG. 2 is shown in FIG. 6. By way of example, this driving power source for the ohmic heating coils is constructed with a power source 60 of up to 2000 volts with single phase current capability of 10 kiloamperes, with a total power capability of 2 Megawatts, a voltage controller 61 which controls the output power of the power source 60, a rectifier circuit 62, which rectifies the controlled output current, a trigger circuit 63, which generates firing signals, and a switching circuit 64 to turn the system on and off.

The vertical field coils 23 of FIG. 2 are for positioning the high energy flux within the toroidal containment vessel 11 are made of copper and encircle the torus in the same fashion as the ohmic heating coils 2t but are configured so that the net vertical field current circulating around the iron core is zero. Residual mutual inductance is cancelled out by raising the mutual inductance in the power feed circuits. An active feedback system from sensors that determine the position of the toroidal high energy flux plasma quickly change the current in the vertical field coils 23 to maintain position within the toroidal chamber.

Figure 7:
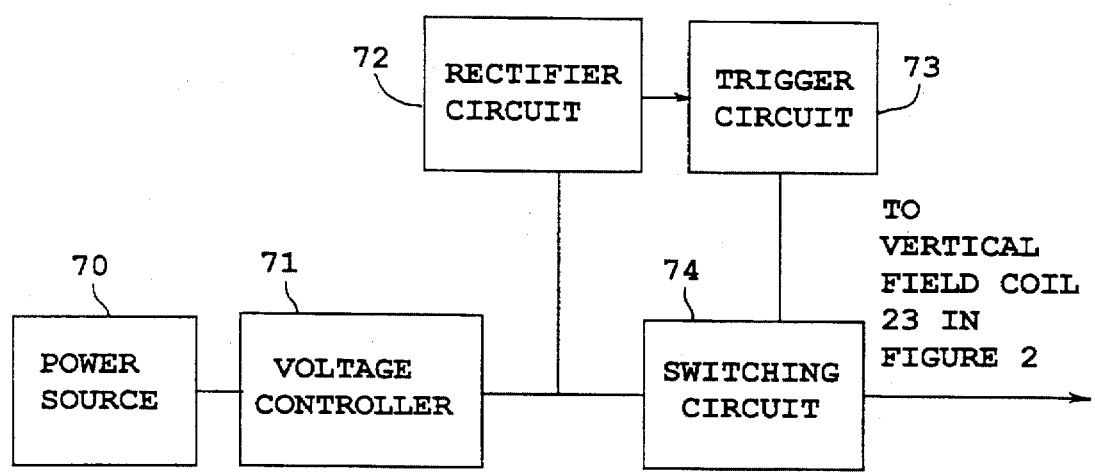
FIG. 7 is a detailed block diagram of a driving power source for the vertical field coils shown in FIG. 1.

A detailed block diagram of the driving power source 24 for the vertical field coils is shown in FIG. 7. By way of example, this driving power source for the vertical field coils is constructed with a power source 70 of up to 180 volts with single phase current capability of 10 kiloamperes, with a total power capability of 2 Megawatts, a voltage controller 71 which controls the output power of the power source 70, a rectifier circuit 72, which rectifies the controlled output current, a trigger circuit 73, which generates firing signals, and a switching circuit 74 to turn the system on and off.

The iron core bias field coils 25 of FIG. 2 consist of 40 turns of copper conductor 2×5 cm in cross section. these are wrapped around the center of the iron core.

Figure 8:
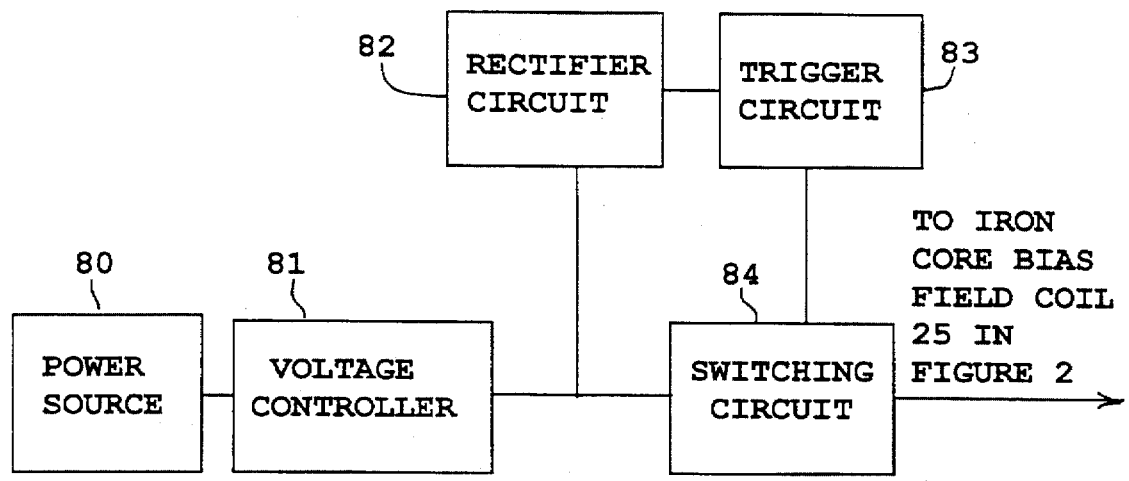
FIG. 8 is a detailed block diagram of a driving power source for the iron core bias field coils shown in FIG. 1.

A detailed block diagram of the driving power source 26 for the iron core bias field coils is shown in FIG. 8. By way of example, this driving power source for the iron core bias field coils is constructed with a power source 80 of up to 180 volts with single phase current capability of 10 kiloamperes, with a total power capability of 2 Megawatts, a voltage controller 81 which controls the output power of the power source 80, a rectifier circuit 82, which rectifies the controlled output current, a trigger circuit 83, which generates firing signals, and a switching circuit 84 to turn the system on and off.

The injector portion 30 of FIG. 3 is for injecting pellets of feedstock material into the process plasma formed with the equipment described above. The injector technology assumed for this example is a a gas fired pellet gun. For detailed discussion of pellet injection equipment options see "Pellet Injection Technology", Combs, Rev. Sci. Instrum., Vol 64, No. 7, July, 1993. The injector is designed to shoot pellets of feedstock material at velocities of up to 3 km/sec.

Driving power sources 42,43 and 44 of FIG. 4 are used either singly or together to rapidly applying large amounts of power, on a time scale of from about 50 millionths to about 400 millionths of a second to for heating and stabilization as the pellet and the process plasma combine to form a combination plasma.

Figure 9:
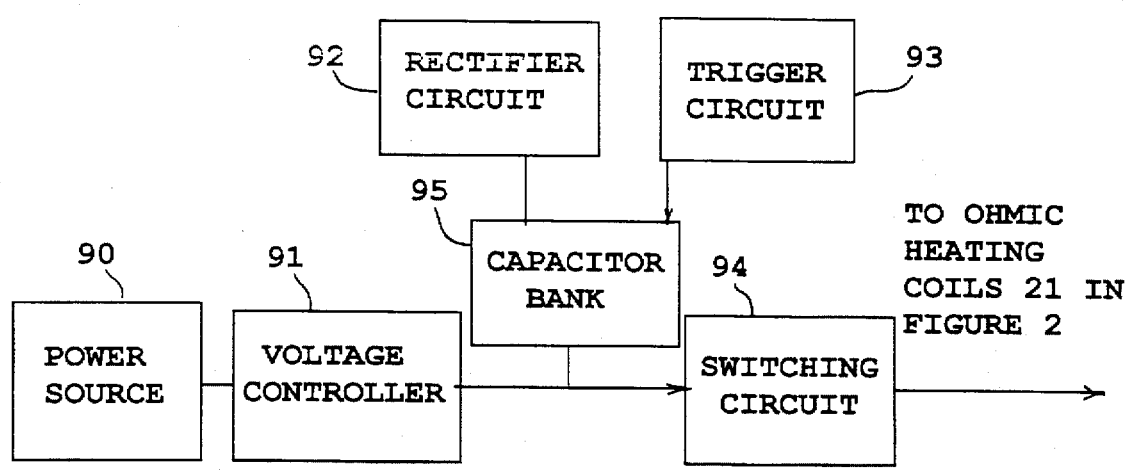
FIG. 9 is a detailed block diagram of an enhanced driving power source for the ohmic heating coils.

A block diagram of the enhanced driving power source 43 for the ohmic heating coils 21 in FIG. 2 is shown in FIG. 9. By way of example, this enhanced driving power source includes a high voltage capacitor bank 95 designed to be able to deliver voltages of 100 kilovolts and currents of up to 50 kiloamperes for a period of about 400 microseconds. This enhanced driving power source 43 is constructed with a power source 90 of up to 2000 volts with single phase current capability of 10 kiloamperes, with a total power capability of 2 Megawatts, a voltage controller 91 which controls the output power of the power source 90, a rectifier circuit 92, which rectifies the controlled output current, a trigger circuit 93, which generates firing signals, and a switching circuit 94 to turn the system on and off.

Figure 10:
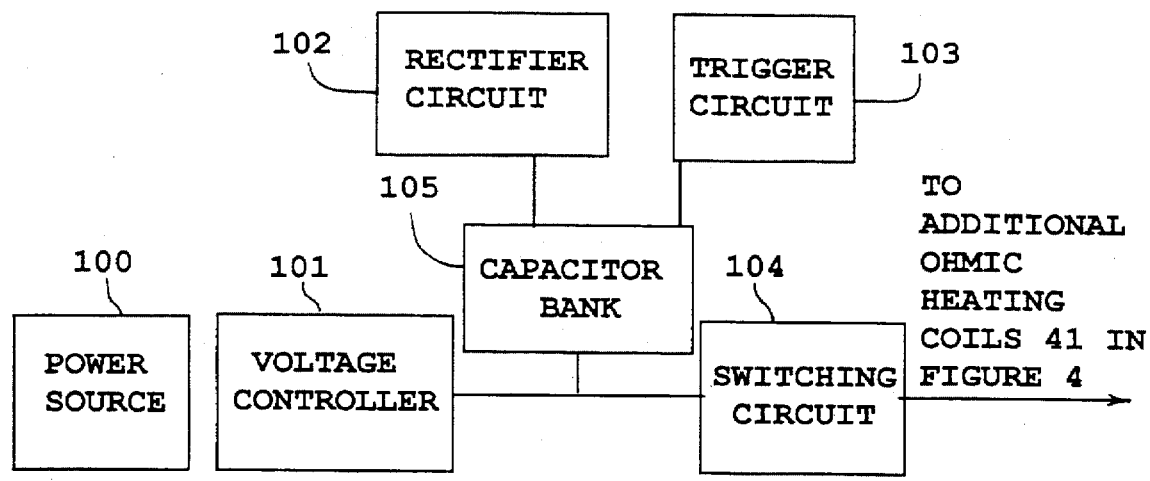
FIG. 10 is a detailed block diagram of the driving power source for the additional ohmic heating coils.

The block diagram of the driving power source 42 for the additional ohmic heating coils 41 in FIG. 4 as shown in FIG. 10. This driving power source 42 includes a high voltage capacitor bank 105 designed to be able to deliver voltages of 100 kilovolts and currents of up to 50 kiloamperes for a period of about 400 microseconds. This driving power source 43 for the ohmic heating coils 16 is constructed with a power source 100 of up to 2000 volts with single phase current capability of 10 kiloamperes, with a total power capability of 2 Megawatts, a voltage controller 101 which controls the output power of the power source 100, a rectifier circuit 102, which rectifies the controlled output current, a trigger circuit 103, which generates firing signals, and a switching circuit 104 to turn the system on and off.

Figure 11:
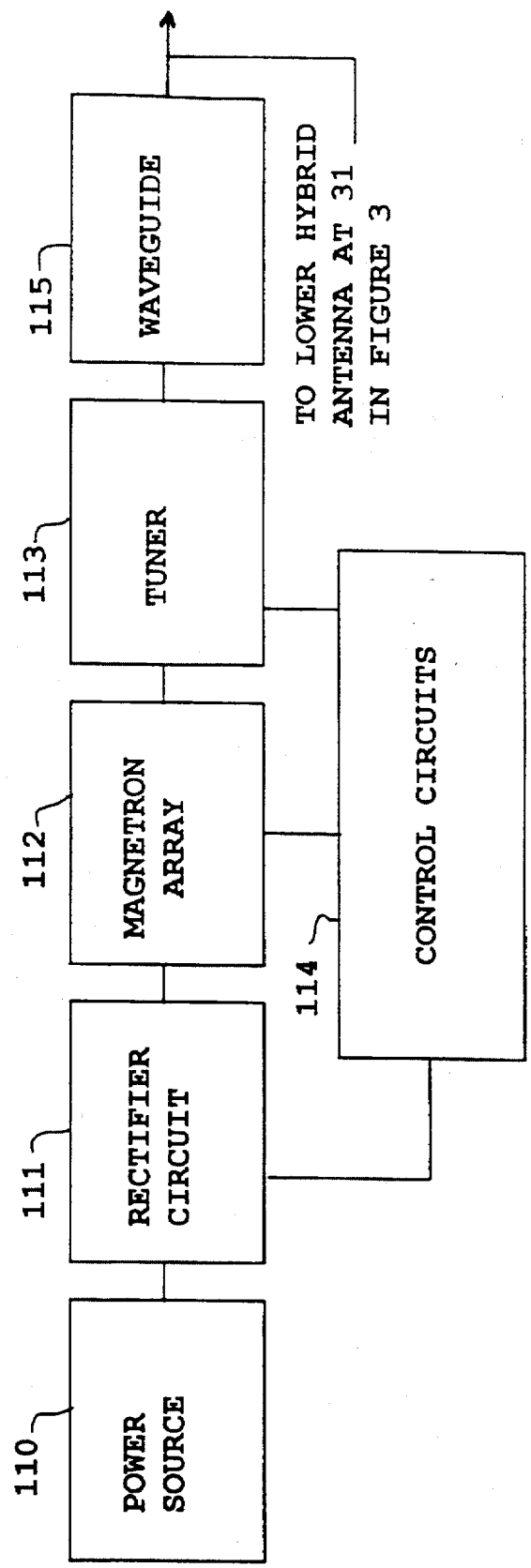
FIG. 11 is a detailed block diagram of a driving power source for the lower hybrid heating system.

A block diagram of the driving power source 44 for the lower hybrid frequency generator in FIG. 4 is shown in FIG. 11. By way of example, the driving power source for the lower hybrid heating system is constructed with a power source 110, of up to 25,000 volts, with a single phase current capability of 1000 amperes, with a total power capacity of 25 megawatts, a rectifier circuit 111 which rectifies the power output, a magnetron array 112 which produces r.f. power between 3 and 10 GHz, a tuner 13 which is automatically driven by control circuits 114 to keep power absorption in the toroidal plasma well matched, as it evolves from a high energy flux plasma to a large volume process plasma. The r.f. is transmitted to the lower hybrid antenna, 31, in FIG. 3 via waveguide, 115.

Figure 12:
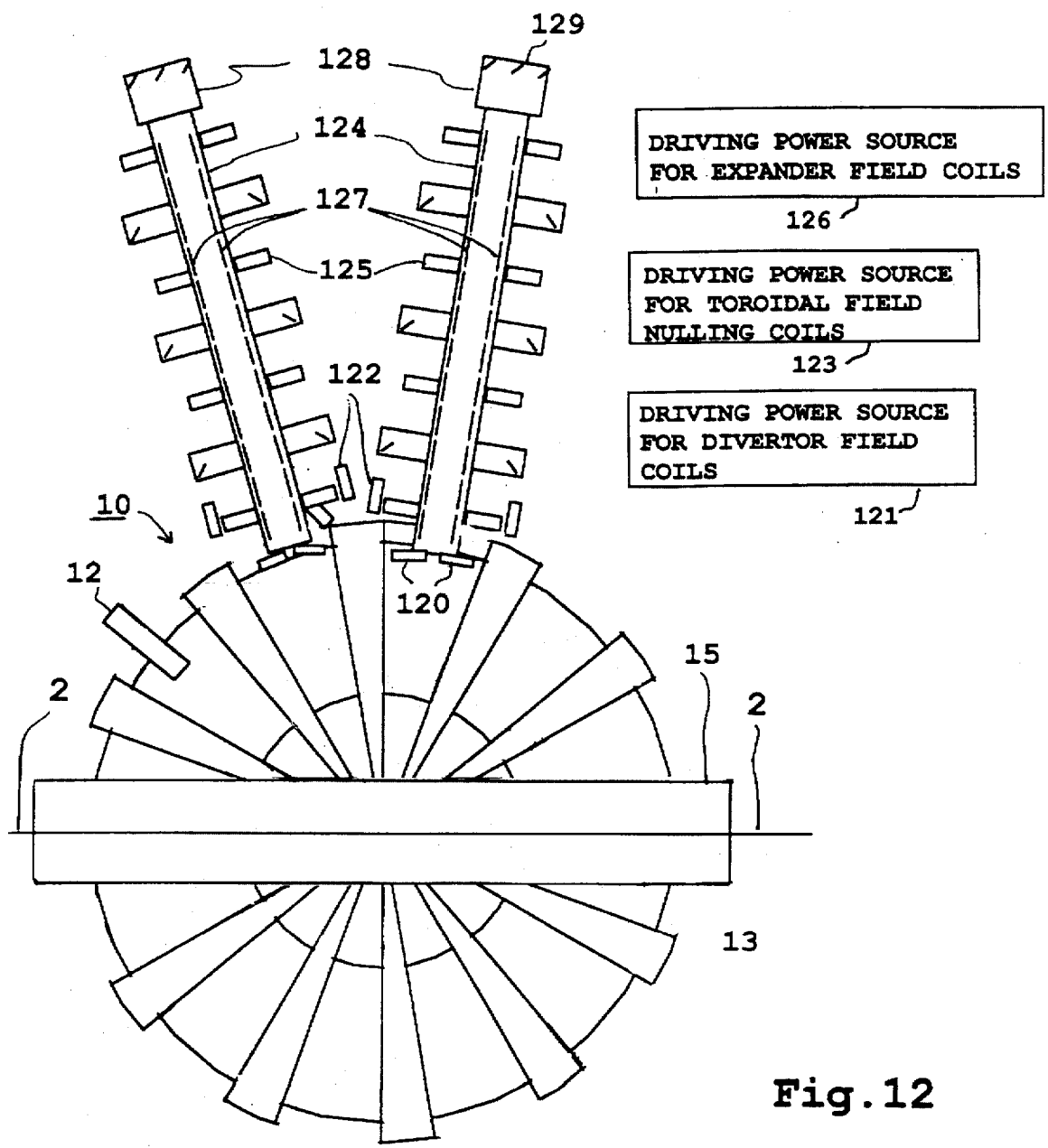
FIG. 12 is a top view and cross section, partly in blocks, showing the addition of magnetic field coils for diverting the plasma from the toroidal containment vessel into an additional containment vessel.

Means of diverting the process plasma out of the containment vessel 11 of FIG. 1 into at least two other containment vessels is a top view and cross section in FIG. 12.

FIG. 12 is a top view and a cross section, partly in blocks, showing construction details of the toroidal containment vessel 11 of FIG. 1 modified by the addition of magnetic field diverting coils 120, a driving power source 121 for the diverting coils, toroidal field nulling coils 122, a driving power source 123 for the toroidal field hulling coils, additional containment vessels 124, expander magnetic field coils 125, driving power sources 126 for the expander field coils, additional deposition stages 127, additional exhaust pipes 128 and louvered cooled collecting stages 129.

The expander field magnetic field coils 125 of FIG. 12 are fitted around the additional containment vessels 124 and are made of copper. The expander magnetic field coils produce a magnetic field approximately parallel to the long axis of the additional confinement vessel and moves the plasma along the chamber. These additional vacuum vessels 124 can each be from 2 to more than 100 meters in length, with a diameter from 1 to more than 10 meters, providing an extremely large surface area for the location of the plasma deposition stages.

Figure 13:
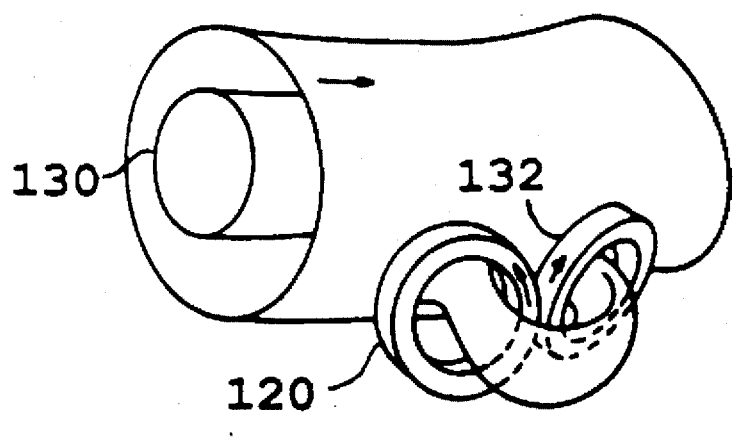
FIG. 13 is a schematic depicting the magnetic fields puckered out by the diverting magnetic field coils of FIG. 12.

FIG. 13 is a schematic the magnetic fields as a surface to show how the magnetic fields 130, along with the plasma am dimpled out to provide the path to divert the high energy flux plasma or the large volume process plasma into the additional containment vessel. The diverting field coils 120 are shaped as shown in in FIG. 13, and can be made of copper. The electric current in the divertor coils goes in the direction shown by the arrows 132. For the technology of divertor field coils, see "Physics of Plasma-Wall Interactions in Controlled Fusion", Post et al, NATO ASI Series, Series B: Physics Vol.131, Plenum Press, N.Y., 1984. Other types of divertors are also possible for use in conjunction with this invention.

The driving power sources can be run either steady state or pulsed. For example, in a pulsed mode of operation, the high energy flux plasma could be removed from the torus and transferred into the second plasma chamber, with injection of pellets in that area. Alternatively, the resultant colder large volume process plasma that is formed from the pellet can be diverted into the second plasma chamber for additional processing, such as adding additional gases to the plasma.

Figure 14:
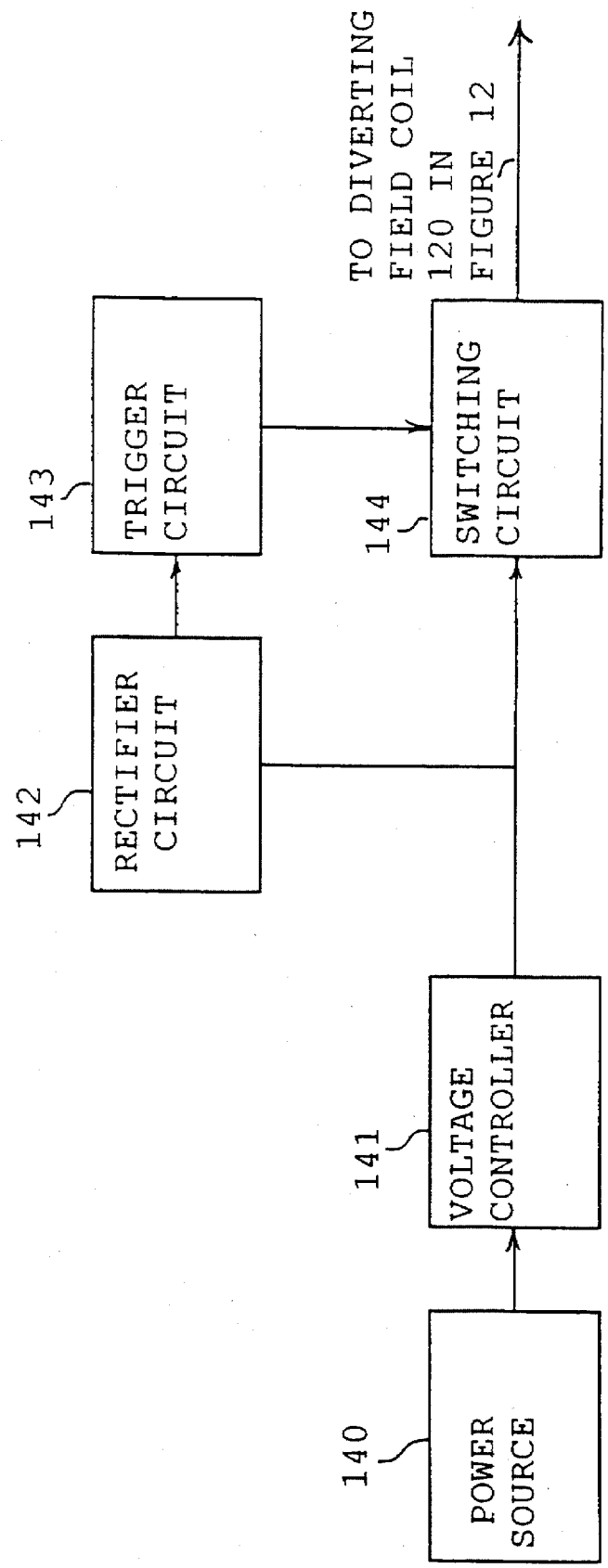
FIG. 14 is a detailed block diagram of a driving power source for the diverting field coil shown in FIG. 12.

A detailed block diagram of the driving power source 121 for the diverting field coils in FIG. 12 is shown in FIG. 14. By way of example, this driving power source for the diverting field coils is constructed with a power source 140 of up to 180 volts with single phase current capability of 10 kiloamperes, with a total power capability of 2 Megawatts, a voltage controller 141 which controls the output power of the power source 140, a rectifier circuit 142, which rectifies the controlled output current, a trigger circuit 143, which generates firing signals, and a switching circuit 144 to turn the system on and off.

Figure 15:
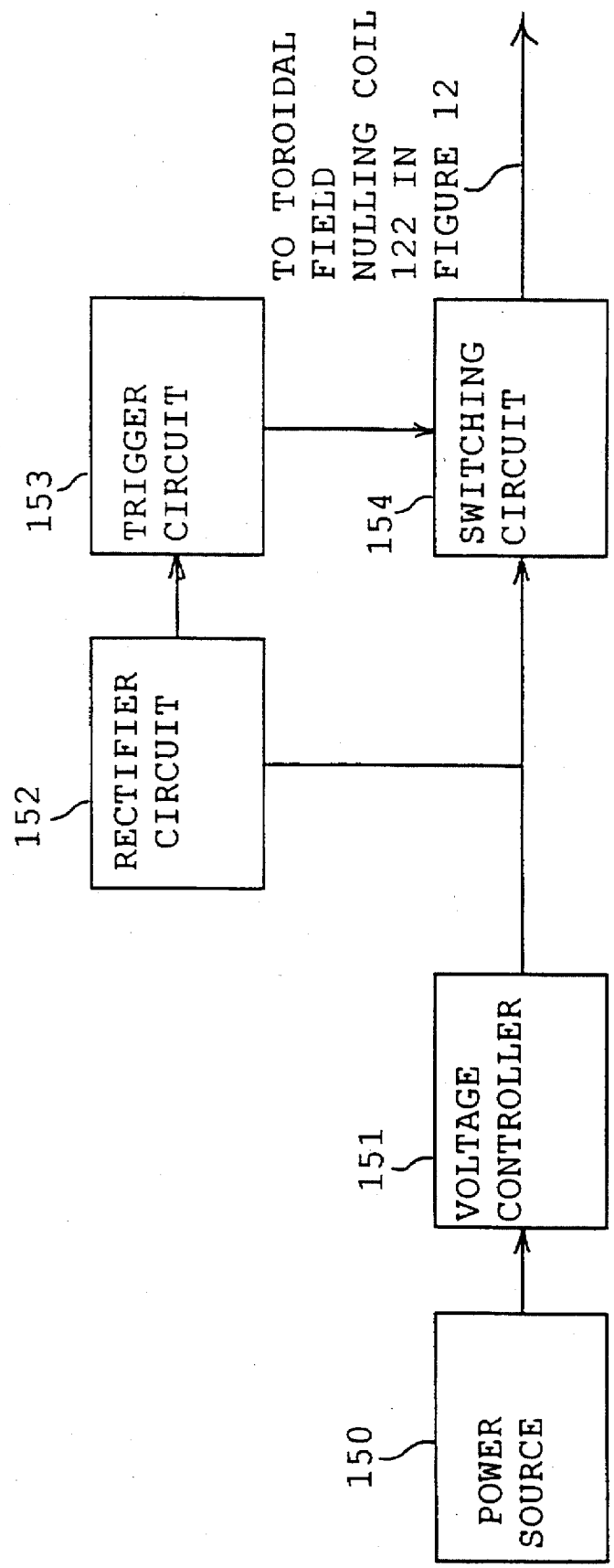
FIG. 15 is a detailed block diagram of a driving power source for the toroidal field nulling coils shown in FIG. 12.

A detailed block diagram of the driving power source 123 for the toroidal field nulling coils in FIG. 12 is shown in FIG. 15. By way of example, this driving power source for the toroidal field nulling coils is constructed with a power source 150 of up to 180 volts with single phase current capability of 10 kiloamperes, with a total power capability of 2 Megawatts, a voltage controller 151 which controls the output power of the power source 150, a rectifier circuit 152, which rectifies the controlled output current, a trigger circuit 153, which generates firing signals, and a switching circuit 154 to turn the system on and off.

Figure 16:
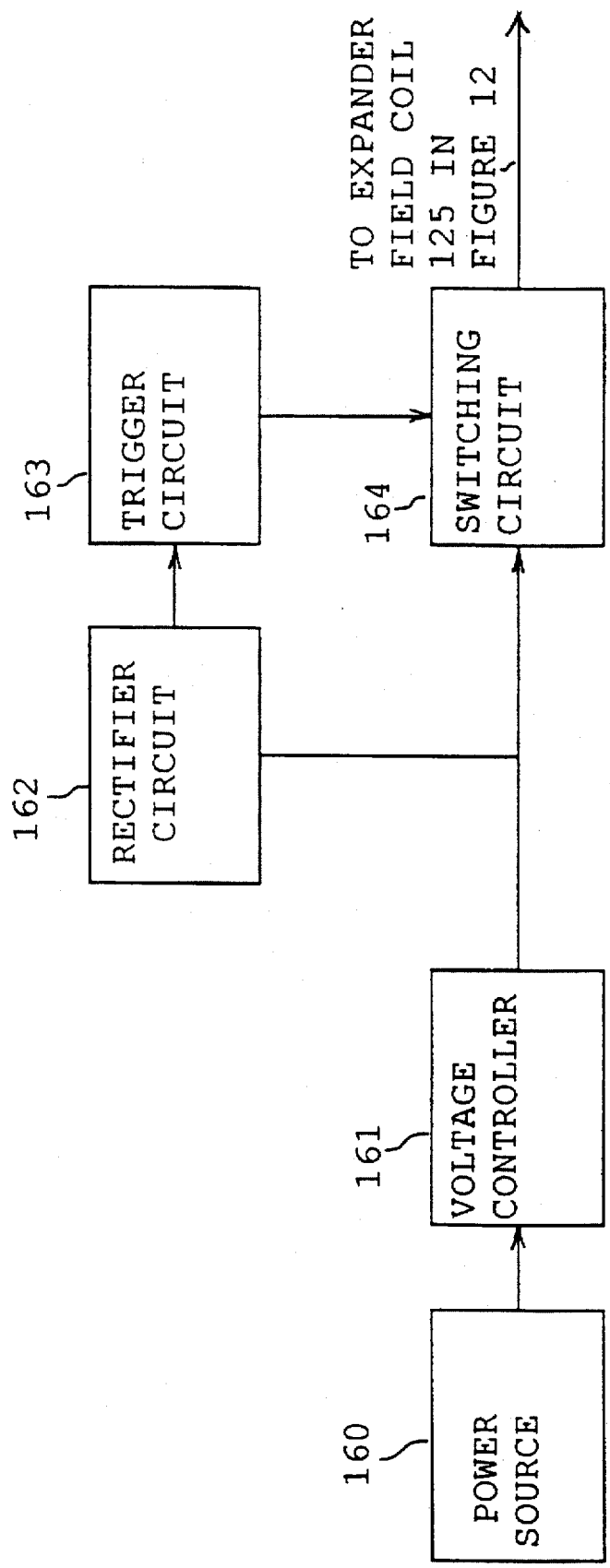
FIG. 16 is a detailed block diagram of a driving power source for the expander field coils shown in FIG. 12.

A detailed block diagram of the driving power source 125 for the expander field coils in FIG. 12 is shown in FIG. 16. By way of example, this driving power source for the diverting field coils is constructed with a power source 160 of up to 400 volts with single phase current capability of 10 kiloamperes, with a total power capability of 4 Megawatts, a voltage controller 161 which controls the output power of the power source 161, a rectifier circuit 162, which rectifies the controlled output current, a trigger circuit 163, which generates firing signals, and a switching circuit 164 to turn the system on and off.

The principal object of this invention is to operate the equipment described above in such a way as to provide a novel method of separating a portion of the species from the other species in any feedstock material such as high level nuclear waste.

Figure 17:
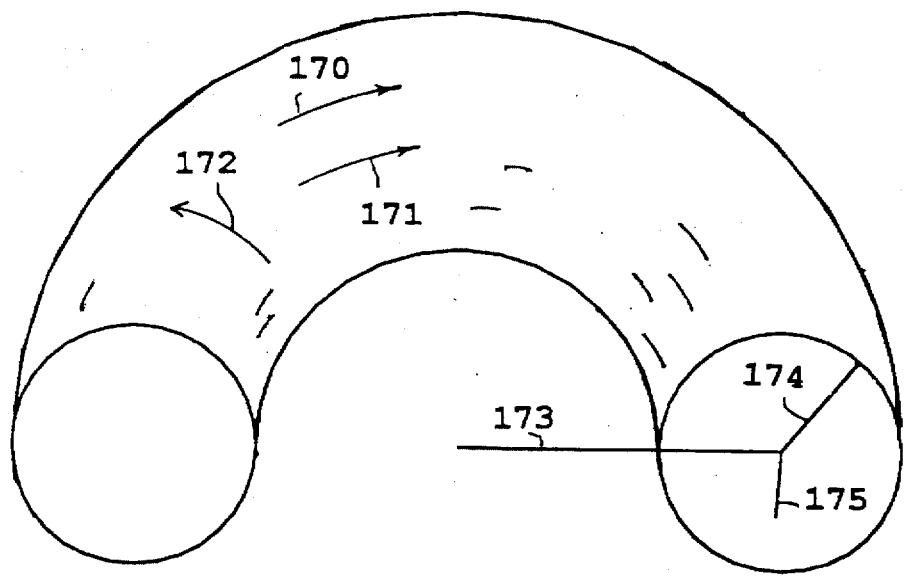
FIG. 17 is a schematic depicting the electric current and magnetic field structure in the toroidal containment vessel.

FIG. 17, describes the geometry of the magnetic fields that will confine the plasma spaced from the walls of the toroidal containment vessel 11 of FIG. 1. Initially, the toroidal magnetic field generation coils 13 of FIG. 1 are first energized with electric current supplied by the driving power source 14 for the toroidal magnetic field coils to produce a toroidal magnetic field 170 designated by $B_t$, as shown in FIG. 17.

Next, the gas in the toroidal containment vessel 11 of FIG. 1 is removed through the exhaust pipe 24 of FIG. 2 to create a vacuum of about $10^{-7}$ torr. Next, a valve in the gas inlet 12 is opened to supply a generation gas, such as hydrogen, helium or neon at a pressure of about $10^{-4}$ torr.

Figure 18B:
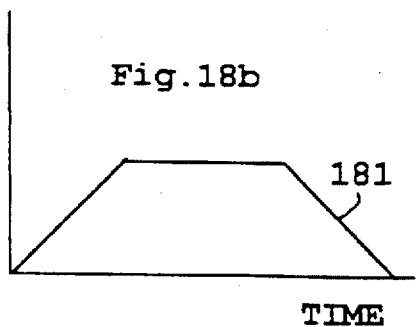
FIG. 18b is a waveform diagram showing the time dependence of the electric current.
Figure 18C:
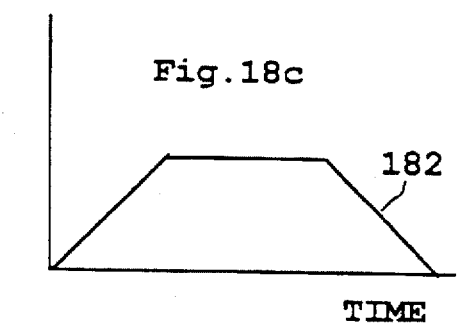
FIG. 18c is a waveform diagram showing the time dependence of electron number density.
Figure 18A:
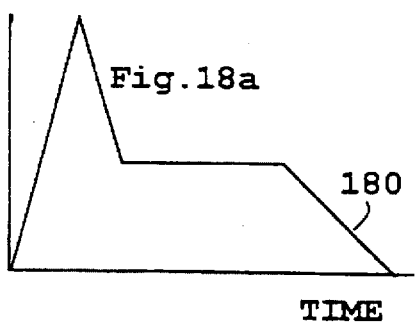
FIG. 18a is a waveform diagram showing the time dependence of the loop voltage which causes ohmic heating current to flow in the toroidal direction in the toroidal containment vessel.
Figure 18D:
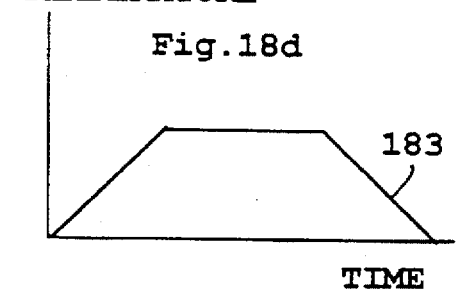
FIG. 18d is a waveform showing the time dependence of the electron temperature.

The ohmic heating coils 21 of FIG. 2 are then energized with electric current from the driving power source 22 for the ohmic heating coils. The time dependence 180 of the applied voltage is shown in FIG. 18a. The ignitor 20 of FIG. 2, which can be an electron beam, is activated at the onset of the ohmic heating coil 21 energization to cause electrical breakdown in the gas and produce an initially low temperature plasma in the toroidal containment vessel 11. This initially low temperature toroidal plasma fills the entire toroidal containment vessel 11, and has an electrical resistance, R. A toroidal electric current 171 designated $J_t$, ohmically heats the plasma. The net ohmic heating power is then given by:

$$P = R J_t^2 \quad (1)$$

similar to ohmic heating in a copper wire. The iron yoke 15 of FIG. 1 inductively couples the electric current in the ohmic heating coils 21 of FIG. 1 with the toroidal current $J_t$. The current in the toroidal direction has an additional function to confine the plasma and keep it spaced from the walls by producing a poloidal magnetic field component, 172 designated $B_p$, which wraps around the plasma as shown in FIG. 17.

The vertical field coils 23 of FIG. 2 are activated with electrical current from the driving power source 24 for the vertical field coils of FIG. 2 shortly after the initial low temperature plasma is formed to aid in keeping the plasma spaced from the walls. The iron core bias field coils 25 of FIG. 2 are used to initially bias the magnetic field in the yoke to increase the time of the flat period in FIG. 18a. Limiters 27 of FIG. 2 are metallic or ceramic water cooled devices that shape the plasma by helping to define the dimension of the space between the plasma and the wall of the toroidal containment vessel 11.

As time increases, this initial toroidal plasma heats and the plasma fills the toroidal volume inside the boundary defined by the limiters and reaches the physical conditions of temperature, energy flux and total energy needed for specific feedstock processing needs. The toroidal current time dependence 181 is shown in FIG. 18b, the electron number density time dependence 182 is shown in 18c and the electron temperature time dependence 183 is shown in 18d. Generation gas is periodically added to the chamber during the plasma formation process via the gas inlet 12 of FIG. 1. The plasma is finally extinguished at the the end of the time period 180 as shown in FIG. 18a when the voltage applied by the driving power source 22 for ohmic heating coils. of FIG. 2 is switched off. This typical time period for this example equipment is from 400 to 600 milliseconds.

The volume of the large volume process plasma is given by the expression below:

$$V = 2\pi R_M r_m^2$$

where:

$R_M$=The major radius of the toroidal volume inside the limiters. (see 173 in FIG. 17.)

=100 cm for this example $r_m$=The maximum minor radius of the toroidal volume inside the limiters. (see 174 in FIG. 17.)

=50 cm for this example

The energy flux is carded mostly by the electrons and is given by the expression:

$$\text{Energy Flux} = nkT\,v4$$

where:

n=electron number density v=average electron velocity k=Boltzmann's constant

T=Electron Temperature

The total energy in the volume V, is:

$$\text{TOTAL ENERGY} = nkTV$$

The physical properties of the typical process plasma are:

Composition: hydrogen atoms, hydrogen ions, electrons

Volume: $10^7$ cm$^3$

Electron Number Density: $3 \times 10^{13}$ cm$^{-3}$

Total Electrons: $3 \times 10^{20}$

Electron Temperature: 500,000 to 10,000,000 degrees Celsius

Energy Flux: 20 KW to 1.6 MW/cm$^2$

Total Energy: 3,000 to 50,000 joules

Pellets of low atomic number materials, such as deuterium, boron, carbon and aluminum have been injected into controlled fusion research plasmas with parameters similar to those described above. See for example, "An Assessment of the Feasibility of Fueling a Tokamak Reactor With Lithium-Tritide Pellets", S. C. McCool et al, University of Texas fusion Research Center Report FRCR #389, May 26, 1991. The controlled fusion research applications of pellet injection include refueling with deutrium or tritium, and limiting the sputtering of high atomic number materials such as iron, tungsten, titanium and molybdenum from the toroidal containment vessel materials. Boron, carbon and aluminum pellets have been injected as pellets, ionized by the plasma and deposited to control sputtering and to act as getting materials on the walls.

FIG. 19 shows the major impact the ablation, vaporization, dissociation and ionization process has on the plasma parameters. Pellets are injected at a time designated by 190 as shown in FIG. 19a. The increase in voltage caused by the pellet injection 191 is shown in FIG. 19a, the temperature drop 193 is shown in FIG. 19d, and the number density increase 192 is shown in FIG. 19c, the perturbations 191, 192, and 193 last about 10 milliseconds. These fusion research pellets are sized such that the plasma can recover and go back to its original parameters, as shown in FIG. 19 without further stabilization efforts.

Figure 20B:
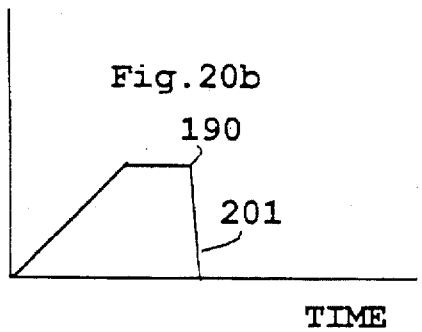
FIG. 20b is a waveform diagram showing the time dependence of electric current during high atomic number pellet injection.
Figure 20A:
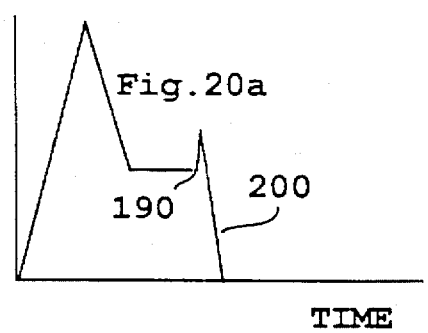
FIG. 20a is a waveform diagram showing the time dependence of loop voltage during high atomic number pellet injection.
Figure 20C:
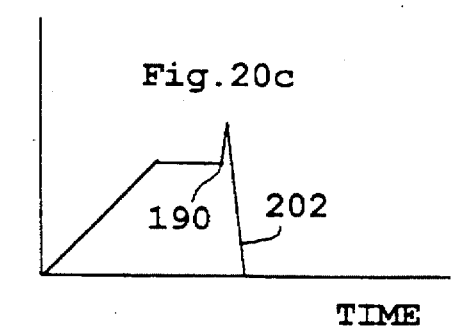
FIG. 20c is a waveform diagram showing the time dependence of electron number density during high atomic number pellet injection.
Figure 20D:
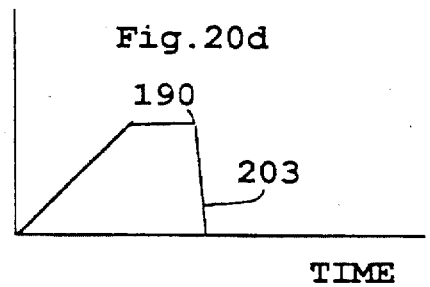
FIG. 20d is a waveform diagram showing the time dependence of electron temperature during high atomic number pellet injection.
Figure 19B:
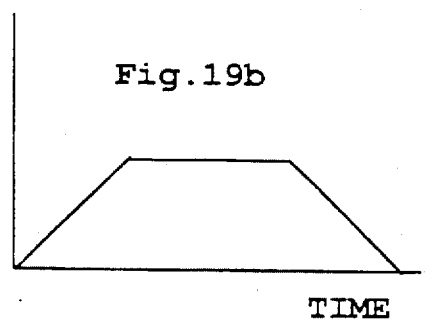
FIG. 19b is a waveform diagram showing the time dependence of electric current during low atomic number pellet injection.
Figure 19A:
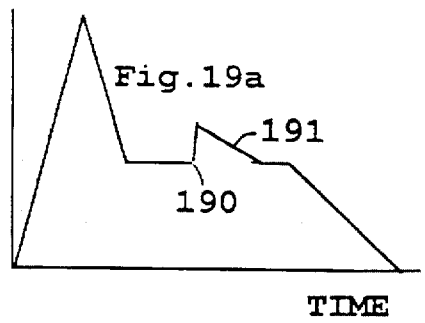
FIG. 19a is a waveform diagram showing the time dependence of loop voltage during low atomic number pellet injection.
Figure 19C:
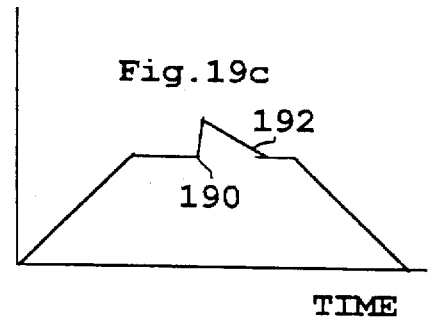
FIG. 19c is a waveform diagram showing the time dependence of electron number density during low atomic number pellet injection.
Figure 19D:
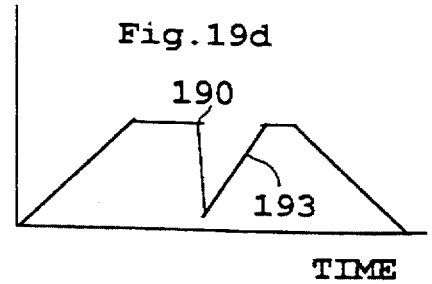
FIG. 19d is a waveform diagram showing the time dependence of electron temperature during low atomic number pellet injection.

Pellets with atomic numbers of about 16 can extinguish the plasma. See for example, "Wall Conditioning Experiments on TFTR Using Impurity Pellet Injection", Strachan et al, Journal of Nuclear Materials 217, 145–153, 1994. Pellets with atomic numbers greater than 16, such as tungsten, with atomic number 74 will abruptly extinguish the plasma, with the behavior shown in FIG. 20. Pellets are injected at a time designated 190. The time dependence of the voltage 200 of FIG. 20a shows the voltage first rising then rapidly going to zero. The time dependence of the current 201 is shown in FIG. 20b. The time dependence of the density 202 is shown in FIG. 20c and the time dependence of the temperature 203 is shown in FIG. 20d.

The following methods are used to prevent the disruption shown in FIG. 20 so that all the elements, from atomic number 2 to 103 that are present in feedstock material such as high level nuclear waste can be first transformed into a "combination plasma" which is a mixture of the ionizing pellet material and the process plasma and evolves into a "product plasma" which is a lower temperature, higher density ionized gas plasma composed principally of the ionized species of elements of the feedstock material with a space maintained between the plasma and the walls of the toroidal containment vessel 11 of FIG. 1.

The feedstock material is prepared for injection into this process plasma by forming it into pellets. The total energy and total number of electrons in the example process plasma described above is sufficient to utilize pellets of 0.01 to about 1 milliliters in volume. The feedstock material can be any material, such as a metal, a non-metal such as alumina or even a liquid or a gas. They can be formed into pellets that are spherical, ellipsoidal or any arbitrary shape. In the case of liquids and gases, they can be frozen and formed into portions which are spherical, ellipsoidal or arbitrary shapes.

High level nuclear waste is difficult to characterize or even sample. The waste can be in several physical forms including solids, sludges, and liquids. It can contain complex chemicals such as nitrates, nitrate salts, hydrated metal oxides, phosphate precipitate and ferrocyanides. One object of this invention is to eliminate the need to characterize the raw waste by inserting small portions of the waste materials of about 0.1 to 2 milliliter in volume into capsules made of teflon or other chemically resistant material, sealing the entrance to the capsule with a means of sealing and then using these capsules as the pellets described here.

The pellets are injected into the "process plasma" using the injector portion 30 of FIG. 3. The depth the pellets penetrate the process plasma depends the pellet size, the atomic number, Z, the magnitude of the energy flux and the total energy available to the pellet. The depth of penetration is also sensitive to the radial location, r, as defined by 175 in FIG. 17. In one mode of operation, the process plasma is produced with a thermal electron distribution, and the pellet ablates by absorbing energy from the electrons and ions of the "process plasma" which leads to rapid cooling. The "process plasma" can be cooled by energy lost by radiation from the multiply ionized high atomic number ions. Besides this cooling effect from radiation the resistance of the plasma can rapidly increase. The resistance of the plasma is given by the expression:

$$R = f(geometry) g(Z_{eff})/T_e^{3/2}$$

where:

f(geometry)=a function of geometric parameters.

g(Zeff)=a function of the average atomic number, $Z_{eff}$, of the ions in the plasma. It increases as $Z_{eff}$ increases.

$T_e$=The average electron temperature

When the feedstock is a material, such as uranium, the atoms can become multiply ionized and increase $Z_{eff}$ which increases the resistance very rapidly, on the order of 50 to 300 microseconds. The resistance could increase by a factor of 10 to 50. This increases the power requirements to maintain toroidal current at a high enough value to maintain a space between the plasma and the containment vessel wall.

It is necessary to rapidly heat the plasma during the pellet injection process to replace energy lost by radiation from multiply ionized high atomic number species. It is also necessary to increase the voltage driving the toroidal current 171 of FIG. 17 to maintain the current and the resultant poloidal magnetic field 172 as the resistance of the plasma rises.

It is necessary to inject the pellet with a velocity such that it doesn't vaporize, dissociate and ionize too quickly, but ionizes before it passes the center of the toroidal plasma.

One reason the pellets must be shot into the plasma with a high velocity (up to 3 km/sec) is because all the energy in the volume is not immediately available because the pellet is immediately exposed to plasma electrons that move parallel to the vector sum of the toroidal magnetic field 170 and poloidal magnetic field 172 components. In most cases, a pellet of diameter, $r_p$, can receive energy quickly only from a volume in the shape of a toroidal shell with a thickness about 10 times the size of the pellet. There are even some locations in which energy is only received from a single tube of plasma with a major diameter of $R_M$ and a minor diameter about ten times the size of the pellet. Thus, to access most of the energy in the whole volume, the pellet is shot into the high energy flux plasma at a velocity from about 0.2 km/sec to 3 km/sec to intersect a sequence of such regions, the specific values of velocity are determined by the feedstock material, pellet diameter and operating conditions of the plasma processor.

To maintain the product plasma spaced from the walls of the toroidal containment vessel 11 of FIG. 1 the toroidal electric current 171, $J_t$ must be maintained at a level sufficient to maintain the poloidal magnetic field 172 of FIG. 17 and thus keep the "combination plasma" and the "product plasma" spaced from the walls as the pellet of any feedstock material is converted into the "product plasma".

At least one method of maintaining the toroidal electric current to use the enhanced driving power source 43 of FIG. 4 as shown in FIG. 9 to rapidly enhance the voltage applied to the ohmic heating cells 21 of FIG. 2 by about a factor of 2 to 100 and thus maintain the toroidal electric current 171 of FIG. 17, $J_t$, constant. Because the plasma resistance is higher, this action also increases the power being applied to the plasma to help balance the radiation losses from the high atomic number ions. The time scale for this voltage to be applied is on the order of 50 millionth of a second to 10 milliseconds. FIG. 21 shows the parameters of voltage, current, electron number density and thermal electron temperatures as this enhanced voltage is applied to a plasma that would have extinguished such as shown in FIG. 20. The pellet is injected at time 190. The voltage time dependence 210 shows the voltage raised to accomodate supplying the necessary increased power in FIG. 21a. The electric current 211 is shown constant in FIG. 21b to facilitate maintaining the space between the product plasma and the wall. The number density 212 is shown elevated in FIG. 21c. The temperature time dependence 213 is shown in FIG. 21d that indicates a lower temperature during the product plasma phase.

Another method of maintaining the toroidal electric current is to use the enhanced driving power source 42 of FIG. 4 shown in FIG. 10 to rapidly increase the voltage applied to the additional ohmic heating coils 41 of FIG. 4 by about a factor of 2 to 100 and thus maintain the toroidal electric current 171 of FIG. 17, $J_t$, constant. These additional ohmic heating coils can be located inside the toroidal containment vessel 11 of FIG. 1 to improve the speed of application of the voltage to the plasma. Because the plasma resistance is higher, this action also increases the power being applied to the plasma to help balance the radiation losses from the high atomic number ions. The time scale for this voltage to be applied is on the order of 50 millionth of a second to 10 milliseconds. The parameters of voltage, current, electron number density and thermal electron temperature behave similar to those of FIG. 21. Another method of maintaining the toroidal electric current is to apply an electromagnetic wave heater at the lower hybrid frequency in such a way that electric current is produced in the plasma, in the same toroidal direction as the ohmic heating current. Lower hybrid heating is accomplished with an r.f. power source of between 3 and 10 Ghz that is oriented to produce an electric field in the same direction as the toroidal electric current 170 of FIG. 17. For an explanation of lower hydrid heating see "One Minute Pulse Operation in the Tore Supra Tokamak", Van Houtte, Nuclear Fusion, Vol.33, No.1,1993.

The antenna 31 is shown in FIGS. 3 and 4. The driving power source 44 for lower lower hybrid heating is shown in figure II. The lower hybrid heating power produces the same beneficial effect as increasing the current as described above and also results in performance as shown in FIG. 21. Overcoming radiation losses can also be accomplished with other electromagnetic wave modes, such as ECRH, and ICRH heating.

Additional containment vessels for carrying out separation of species is provided as shown in FIG. 12 by adding additional magnetic field coils that can modify the magnetic field configuration so as to divert either the plasma in the toroidal containment vessel 11 of FIG. 1 into additional containment vessels.

FIG. 12 is a top view and a cross section, partly in blocks, showing construction details of the toroidal containment vessel 11 of FIG. 1 with the addition of the necessary equipment to divert the plasma out of the toroidal containment vessel t 1 into a second containment vessel 124 of FIG. 12. The magnetic fields generate a magnetic channel as shown in FIG. 13, which provides a pathway for the charged particles to follow that takes them into the second containment vessel 124. This second containment vessel can be from one meter to tens of meters long. The plasma is guided along the chamber by the magnetic field generated by the expander field coils 125. The power supplies to drive the magnetic field coils are described in FIGS. 14, 15 and 16.

Additional magnetic field diverting equipment such as shown in FIG. 12 and powered by driving power sources described in FIGS. 14 to 16 can be added at different locations around the circumference of the toroidal vacuum chamber 11 of FIG. 1. Thus, for separation of element purposes, a multiplicity of 1, 2 or more diverting regions is available.

Another object of this invention is to repetitively perform pellet injections and repeat the processes described above. FIG. 21 illustrates the physical parameters of a single pellet injection and coating event of about 400 milliseconds duration. For commercial operations it is desirable to repetitively inject pellets to achieve commercial thruput of material.

FIG. 22 is a graph of the toroidal electric current in a repetitively pulsed system. The time for the high energy flux plasma to be formed and heat to a proper temperature is designated as 220 or $t_h$. The time to vaporize, dissociate, ionize and collect species on the deposition stages 45 of FIG. 4, is designated 221, or $t_v$. The time to reset the system for producing another sequence is designated 222, or $t_r$. In the case of Tokamak research devices, the coatings applied are partially removed each time the high energy flux plasma is produced because of sputtering from the energetic ions in the high energy flux plasma.

For a high Z feedstock and coating, sputtering of high Z materials during the ohmic heating stage 220, could make it difficult to re-heat because of energy loss from radiation. Such sputtering of material deposited on the deposition stages can be diminished by at least one other means such as moving the limiters 27 of FIG. 2. The height of the limiter above the deposition stage determines the fraction of high energy plasma particles that are intercepted by the limiter compared to those stdking the deposition stages. If the limiter is close to the deposition stages, say about 2 cm, during the deposition stage 221, $t_v$, the limiter will intercept a minimal amount of the flux. During the reset time 222 ,$t_r$, the limiter is moved to a position of 10 to 20 cm above the surface of the deposition stages, in which case most of the energetic plasma particles strike the limiter instead of the deposition stage. Alternatively, by changing the electric current in the divertor 120 of FIG. 12, the divertor can divert a minimal fraction of the high energy particles if it diverts from a position within about 2 cm of the surface of the deposition stages during the deposition stage, $t_v$, and diverts from a position 10 to 20 cm above the surface during the reset time 222, $t_r$. Still another technique is to make the deposition stages in a manner such that their surface can be rotated 180 degrees prior to the reset time, $t_r$, and display a low Z surface during the heating period 220, or $t_h$.

The radial distribution of feedstock species in the product plasma formed from the feedstock can be controlled by varying the diameter of the pellets, by the velocity of pellet injection and by the properties of the initial high energy flux plasma produced by the large volume plasma processor.

The coordination and operation of the above stabilization techniques is done with feedback systems that monitor the position, temperature, density and other conditions of the "process plasma" the "combination plasma" and the "product plasma" as each occurs and activates the stabilization systems described above appropriately, in coordination with the vertical field coils 23 of FIG. 2 to keep the system centered in the toroidal containment vessel 11 of FIG. 1.

The principal object of this invention is to provide novel methods of separating from each other a portion of species from the other species in any feedstock material, such as high level nuclear wastes. Generation of a product plasma that is composed principally of the ionized and unionized species of elements of the feedstock material by means of injecting portions as pellets into the large volume plasma processor described above is the first step of each of the methods and is crucial to the invention. This is a unique starting point for separation of wastes.

Another object of this invention is to characterize the elements in high level nuclear waste by identifying the species of elements in the waste in real time with spectrometers as the elements are separated and collected with the techniques described below.

Spectrometers in the uv, ir, optical and x-ray portions of the spectrum, identify the species in the large volume process plasma on a time scale of about 1 millisecond. This information is used to determine the appropriate separation steps in real time and the information is also used to keep track of the radiation level collected on various deposition stages.

One principal method in accordance with this invention utilizes the large volume plasma processor in a sequence of seven steps to separate most of the radioactive elements from the other elements in high level nuclear waste.

Typical radioactive tank waste from Hanford tank 241-56-101 is used as an example. See for example, "Laboratory Characterization of Samples Taken in May, 1991 from Hanford Waste Tank 241-54-101", Westinghouse Report WHC-SD-WM-DTR-024, Feb. 18, 1992. A sample distribution of the waste in a tank is shown in Table 1. The percentage of specific species of the waste varies from sample to sample, and thematerial can be solid, liquid, or slurrie. The sample in Table 1 is sufficiently representative to illustrate the use of the invention for separation purposes. The radioactive species are the most troublesome portion of the waste and one purpose of this separation method is to separate these species from the other species.

The first step of the method is to place a portion of the waste material in a capsule as described above, then inject the capsule into the process plasma in the large volume plasma processor and convert into a product plasma composed of the ionized and unionized elements of the waste material. The distribution of the elements in the waste characterized in Table 1 is presented in Table 2. Note that the severe problem of waste characterization is reduced to the identification of a few elements. Most of the waste is hydrogen, oxygen and nitrogen. Separating those from the other elements greatly simplifies the high level nuclear waste problem.

The deposition stages in the first plasma chamber 11 of FIG. 1 can be surfaced with a variety of substances. For example, the deposition stages can be surfaced with a glass or ceramic substance such as soda-lime/alumino silicate glass. A glass or ceramic substance is chosen so that the recovered materials can be directly fed into a radioactive waste storage vessel for further storage. See for example, "Technical and Project Highlights for the Defense Waste Processing Facility", J. B. Mellon et al Proceedings of the 1989 Joint International Waste Management Conference, Kyoto, Japan, Oct. 23, 1989. Alternatively, the deposition stages could be coated with graphite or graphite composits that could be used as blanked material in accelerator driven devices designed to transmute the radioactive materials into more benign materials. See for example, "Accelerator-Driven Transmutation of Waste (ATW)", F. Venneri, et al, Los Alamos, Apr., 1993.

Figure 23A:
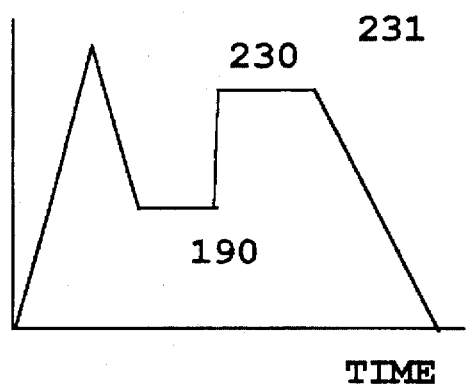
FIG. 23a is a waveform diagram of the time dependence of the loop voltage during stabilized high atomic number pellet injection.
Figure 23B:
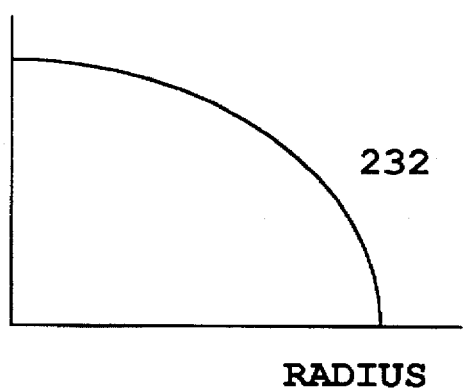
FIG. 23b is a graph of the species concentration versus radius.

Initially, the limiter and divertor are withdrawn to a position within about 0.5 to 5 cm of the surface of the deposition stages. The capsule is injected and is transformed into a product plasma containing the ionized and unionized species of elements of the waste material in about 1 millisecond. The waveform of the time dependence of the density is shown in FIG. 23a. A typical radial distribution of the elements as shown in FIG. 23b. The species on the outer edge strikes the deposition stage in less than 1 millisecond. The second step of the method is to maintain the product plasma spaced from the walls of the toroidal containment vessel 11 of FIG. 1 for a period of time 230 of FIG. 23 of about 50 to 75 milliseconds, which is the period of time it takes the species in the center of the plasma to diffuce to the edge of the plasma. The plasma density adjacent to the deposition stage is about $n=10^{14}/cm^3$ with a temperature between 1 ev and 50 ev (11,000° C. and 550,000° C.)

Step three is to separate a portion of the species from the other species. This is accomplished during the time period 230 of FIG. 23a by the following means. The atoms and ions on the edge of the plasma strike the deposition stages 45 of FIG. 4, with some sticking and others reflecting back into the plasma, where the now neutral elements can be reionized and become pad of the remaining product plasma.

Some of the species, such as the metals and carbon, have ionization rates at a electron number density of $10^{14}/cm^3$ and a plasma temperature of 10 to 30 ev (110,000° to 333,000° C.) of about $10^7$/sec while oxygen and hydrogen have ionization rates of $10^5$ to $10^6$/sec. See for example "Physics of Plasma-Wall Interactions in Controlled Fusion", Post et al, NATO ASI Series, Series B: Physics Vol.131, Plenum Press, NY, 1984 or "Collisional Processes of Hydrocarbons in Hydrogen Plasmas, A. B. Ehrardt et al, PPPL-2477, Princeton University, Sep., 1987.

The process of reflecting from the deposition stages and reionizing in the remaining product plasma is an effective means of separating a portion of the species from the other species. During the 50 to 75 milliseconds the product plasma is confined, as shown in 230 of FIG. 23, hundreds of recycling events occur. By heating the deposition stages in the toroidal containment vessel 45 of FIG. 4 to a surface temperature of about to about 800° C. by means of heating cooling coils the alkali metals can be prevented from sticking to the deposition stages and will remain in the remainder product plasma along with oxygen, hydrogen, nitrogen and other high ionization probability elements.

Thus, the deposition stages in the toroidal containment vessel 45 of FIG. 4 separate out and collect a portion of waste material including metals, and carbon and other elements with similar ionization coefficients and vapor pressures. The species collected in the first vacuum chamber are listed in Table 3.

Step four of the method is by means of increasing the electric current in the magnetic field diverting coils 120 of FIG. 12, at the end of the time period 230 of FIG. 23, to divert the remainder plasma into an additional containment vessel 124 of FIG. 12. The remainder product plasma, at the end of the time period 230 in FIG. 23, contains oxygen, nitrogen, hydrogen, sodium, cesium and trace amounts of other materials with similar ionization coefficients and vapor pressures. The species remaining are indicated in Table 4.

Step five of the method is to use the expander field magnets 125 of FIG. 12 as a means of moving the remainder plasma along the additional containment vessel axis while it cools rapidly by radiation losses and the highest ionization potential species recombine faster than the lower.

For example, the ions of atoms with ionization potentials greater than 8 ev ,such as oxygen, will recombine faster than the ions of alkali metals, which have ionization potentials in the 4 to 5 ev range.

Step six of the method is to collect the species in the remainder plasma on deposition stages located along the first 1 to 5 meters of the chamber are struck primarily by high ionization potential atoms, such as O and N. The O and N recombine and become $O_2$ and $N_2$ and have low probability of reionization because the plasma is now in the 1100° C. to 11,000° C. range. Trace amounts of metals and other species still strike these first deposition stages because collisions and instabilities within the plasma prevent perfect separations. These additional deposition stages 127 of FIG. 12 are similarly held at about 800° C. to prevent deposition of Sodium and Cesium. The Oxygen, Nitrogen and Hydrogen are collected on cryogenically cooled louvers 129 of FIG. 12. The plasma streaming into the last stage of the additional confinement vessel 124 of FIG. 12 is composed primarily of cesium, sodium and potassium, along with traces of other species. The end of the chamber is covered with deposition stages 127 of FIG. 12 that are maintained at room temperature. These deposition stages collect the sodium and cesium as well as remaining metals and some other remaining trace species.

The seventh step of the method is to remove the deposition stages and cooled louvers from the toroidal confinement vessel 11 of FIG. 1 and the additional confinement vessel 124 of FIG. 12.

Figure 24:
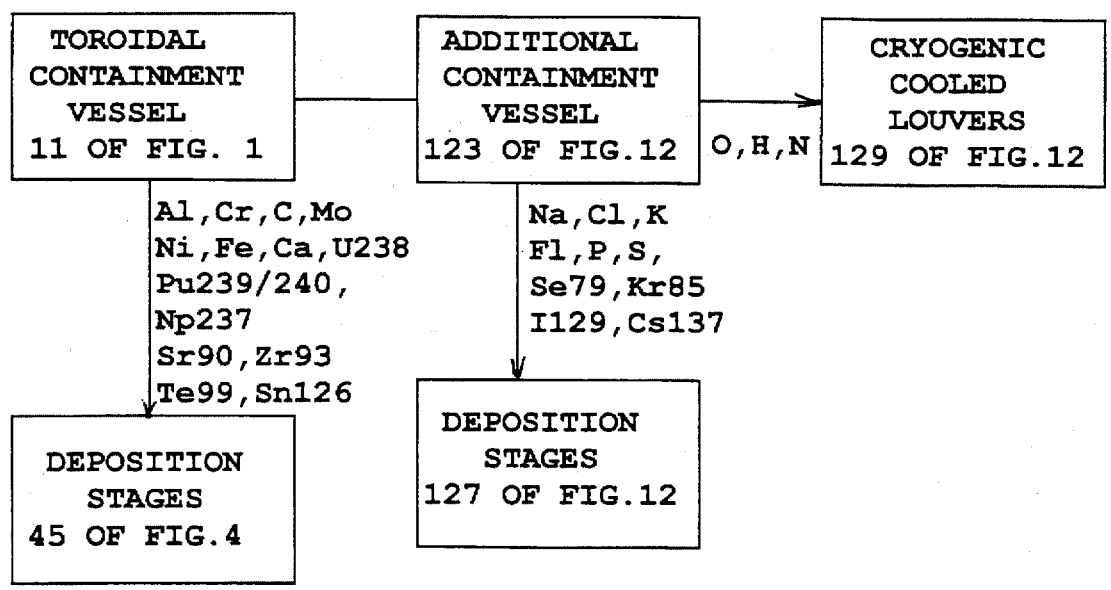
FIG. 24 is a block diagram of the separation of species using the first principal method.

A summary of the flow diagram for separation of species is shown in FIG. 24. The most highly radioactive species, the actenides and the fission fragments are collected primarily on the deposition stages 45 of FIG. 4 which are located in the toroidal containment vessel 11 of FIG. 1. Much lower levels of actenides and fission fragments are collected on the additional deposition stages 127 of the additional containment vessel 124 of FIG. 12. $^{137}Cs$ is collected along with sodium primarily on the room temperature deposition stages 127 FIG. 12. The gases $O_2$, $N_2$, $H_2$ are collected primarily on the cryogenic louvers 129 in FIG. 12.

After about 1 to 2 barrels of waste are processed, the chamber can be shut and the separated materials removed. The glass deposition layers containing heavy actenide and fission fragment concentrations can be crushed and melted for deposition in steel casks suitable for transfer to permanent high level waste storage facilities. The glass deposition layers containing traces of actenides and fission fragments from the deposition stages in the second plasma chamber can be similarly crushed and melted for deposition in steel casks suitable for transfer to low level waste storage facilities. The $^{137}$Cs and Na collected on the room temperature louvers can be drawn off and separated by melting point differences. The gases can be drawn off and filtered of remaining trace elements and either stabilized in solid matrices or recycled to the air.

Another object of this invention is a means of separating the species of elements from each other on the basis of their differential sputtering rates. The accomplish this, the deposition stages 45 of FIG. 4 in the toroidal containment vessel 11 of FIG. 1 are surfaced with material that has a higher sputtering coefficient for some species of elements than for other species of elements. Similar to step 3 detailed above, during the time period 230 of FIG. 23a, the species of elements recycle between the surface of the plasma and the deposition stages 45 of FIG. 4. The species of elements that sputter most will thus preferentially build up in the remainder of the product plasma and can then be diverted into an additional containment vessel 124 of FIG. 12 for collection on the additional deposition stages 127 of FIG. 12.

Another object of this invention is a means of separating the species of elements from each other on the basis of their differential physisorption and chemisorption attachment rates. Chemisorption is the formation of a chemical bond between the incident atom or molecule and the surface of the material and physisorption is the attachment of the atom or molecule to the surface of the material because of attractive atomic or molecular forces. These are the phenomena that form the basis of commercial ion vacuum pumping technologies. To accomplish separation of species in this manner, the deposition stages 45 of FIG. 4 in the toroidal containment vessel 11 of FIG. 1 are surfaced with material with chemisorption or physisorption properties that are attach some species of elements more other species of elements. Similar to step 3 detailed above, during the time period 230 of FIG. 23a, the species of elements recycle between the surface of the plasma and the deposition stages 45 of FIG. 4. The species of elements that sputter most will thus preferentially build up in the remainder of the product plasma and can then be diverted into an additional containment vessel 124 of FIG. 12 for collection on the additional deposition stages 127 of FIG. 12.

This invention therefore separates the actenides and fission fragments from the bulk waste and converts it to a form suitable for permanent storage. All processing, up to the collection stage takes place in a vacuum thus minimizing the probability of any dangerous effluents.

A second principal method in accordance with this invention differs from the first principal method by carrying out the separation of the species of elements from each other entirely in the additional confinement vessel 124 of FIG. 12. A sequence of seven steps is required to separate the species in any material, such as high level nuclear waster.

The first step of the second principal method is to place a portion of the waste material in a capsule, then inject the capsule into the process plasma in the large volume plasma processor and convert the capsule into a product plasma composed of the ionized and unionized elements of the waste material. The distribution of the elements in the waste characterized in Table 1 is presented in Table 2.

Figure 25:
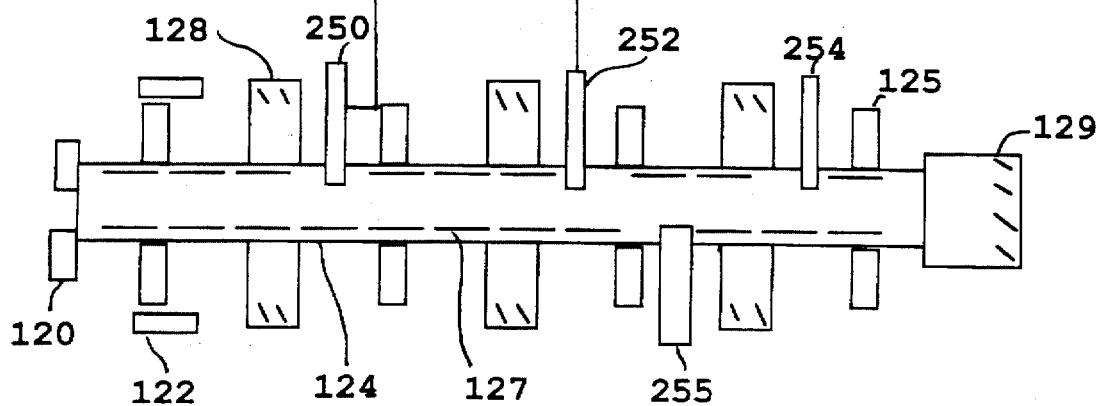
FIG. 25 is a cross section of an additional confinement vessel equipped with various separation devices.

The second step of the second principal method is to divert the product plasma into an additional containment vessel 124 of FIG. 12 at the beginning of the time period 230 of FIG. 23a, about 1 millisecond after the capsule is injected and before any repeated cycling of the species between the plasma surface and the deposition stages 45 of FIG. 4 can occur. Means are provided in the additional containment vessel 124 of FIG. 12 to separate the species of elements from each other as shown in FIG. 25. FIG. 25 is a cross section partly in blocks of an additional containment vessel 124 of FIG. 12 comprising in addition to the features detailed in FIG. 12, equipment comprising an electromagnetic wave antenna 250, a driving power source 251 for the electromagnetic wave antenna, an rf ponderomotive force applicator 252, a driving power source 253 for the rf ponderomotive force applicator, atomic and molecular beam projectors 254, and bead projectors 255.

Step three of the second principal method is to use the expander field magnets 125 of FIG. 12 a means of moving the remainder plasma along the additional containment vessel axis.

Step four of the second principal method is to control the temperature of the product plasma to a range between 10,000° C. and about 50,000° C. by at least one means such as radiation cooling to lower the temperature and by at least on means of raising the temperature such as with electromagnetic wave heaters. The electromagnetic wave antenna 250 of FIG. 25 can be configured to apply rf or microwaves and to operate between 50 Mhz and 290 Ghz.

Step five of the second principal method is to separate some of the species of elements from each other on the basis of their differences in ionization potential, whereby species with ionization potentials below about 8 ev, such as the alkali metals and most metals, are maintained in an ionized state and continue to be confined by the parallel magnetic fields of the additional confinement vessel 124 of FIG. 12, while species with ionization potentials above 8 ev, such as oxygen, nitrogen, and hydrogen, recombine and strike the deposition stages 127 or enter the exhaust pipes 128 and finally collect on the cryogenically cooled louvers 129 off FIG. 12. See for example, "Alkali Metal Purification by Contact Ionization in a Magnetoplasma Device," P. H. Schmidt et al, Physics of Fluids, 4919, 1968.

Step six of the second principal method is to collect the metals, and alkali metals on room temperature cooled deposition stages 124 of FIG. 12 at the end of the additional containment vessel, while the remaining oxygen, nitrogen and hydrogen are collected on cryogenically cooled louvers 129 of FIG. 12.

The seventh step of the second principal method is to remove the deposition stages and louvers with the separated collected species.

Another object of this invention is a means of separating the species of elements from each other on the basis of their differences in charge exchange cross sections with different atomic and molecular species. To accomplish this, the atomic or molecular beam projectors 254 of FIG. 25 direct atomic or molecular beams perpendicular to the axis of the additional containment vessel 124 at a specific location and cause specific species to become neutral atoms and thus no longer restricted by the magnetic fields and to strike the deposition stages 127 in the vicinity of the atomic or molecular beam projectors 254 of FIG. 25.

Another object of this invention is a means of separating the species of elements from each other on the basis of their differences in charge to mass ratios. To accomplish this, rf ponderomotive force applicators 285 of FIG. 25 are located along the axis of the additional containment vessel 124 and are used to stop the motion of ions along the parallel magnetic field so that they recombine into atoms and are collected on deposition stages 127 in the vicinity of the rf ponderomotive force applicator 255. See for example, "New Method to Improve He-removal Performance of Pump Limiter by RF Ponderomotive force", T. shoji et al, J. of Nuclear Materials, 220–222, pp 483–487, 1995.

Another object of this invention is a means of separating the species of elements from each other on the basis of their differences in attachment to ceramic, glass or other non-metallic beads. To accomplish this, bead projectors 256 of FIG. 25 are located along the axis of the additional containment vessel 124 and inject beads that are made of materials chosen to collect some species more than others. The beads are collected after transit through the plasma and are removed from the chamber, with their cargo of collected species.

Figure 26:
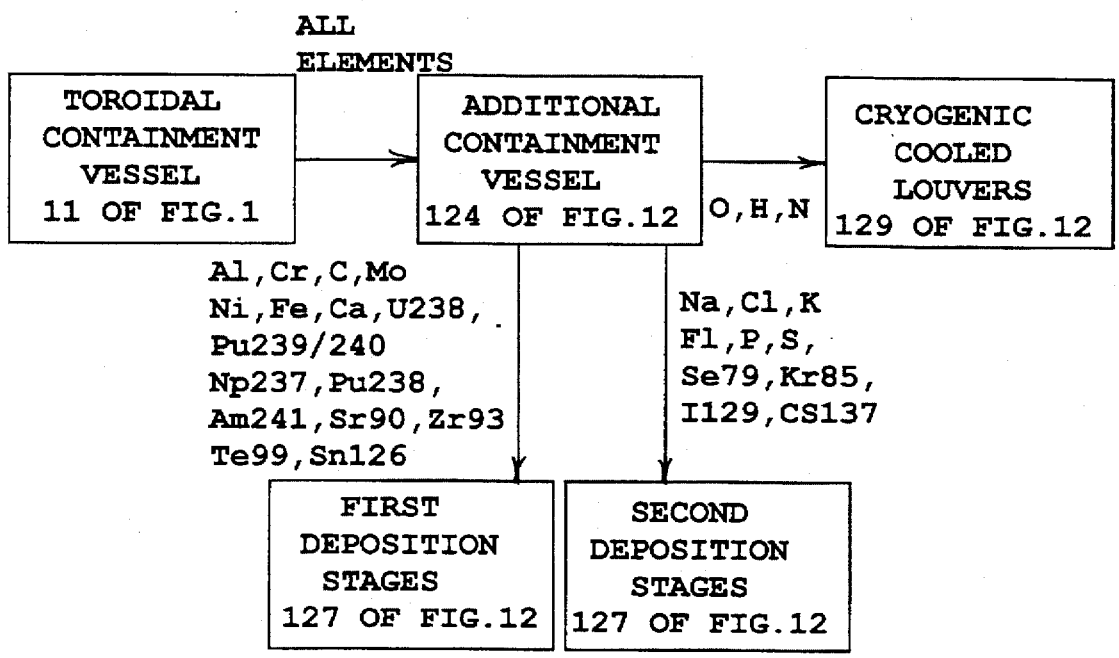
FIG. 26 is a block diagram of the separation of species using the second principal method.

This second principal method of this invention therefore separates the actenides and fission fragments from the bulk waste and converts it to a form suitable for permanent storage. All processing, up to the collection stage takes place in a vacuum thus minimizing the probability of any dangerous effluents. A flow diagram of the separated species, with high level nuclear waste as the input is shown in FIG. 26.

The third principal method in accordance with this invention utilizes the spectrometer obtained information that identifies the species and their spatial location in the product plasma and a decision made to divert the identified species into at least one additional containment vessels, each of which is equipped with the means to separate the species of elements from each other by one or more of the methods described above. For example, in the case of separation of high level nuclear waste, two additional containment vessels 124 of FIG. 12 are used. As the level of radioactive species is identified in the edge region of the product plasma in the toroidal containment vessel 11 of FIG. 1 a divertor diverts the plasma into the additional containment vessel equipped to separate high level waste. If the edge region of the product plasma contains low levels of radioactive species, it would be diverted into an additional containment vessel equipped to separate low level waste.

Thus, a unique new method and apparatus for characterization, separation and preparation for either permanant storage or transmutation of high level nuclear wastes has been invented. In essence, the methods described herin use the magnetic confinement of the plasma spaced from the walls of the containment vessels as a gate to regulate when and where specific elements are collected. This is a unique new use of confinement by toroidal magnetic fields.

The method operates in a vacuum environment which minimizes any chance of residual leakage during material handling or during the separation process. The separated actenides and fission fragments are collected on glass, which is an ideal material for permanent storage containment. Characterization of collected materials is complete because of the ability to identify species spectrometrically as the processing procedes.

The waste is characterized and separated in real time. Only 0.1 to two milliliters of material are processed at any given time, eliminating the threat of an accident. The waste collected is suitable for preparation for permanant storage because it is identified and the permanant storage container will have known chemical composition. If it is prepared for accelerator driven transmutation, the geometry and reactivity of the specimens can be well determined.

This invention has many possible ramifications and future developments. The example apparatus described above can process about 1 barrel of radioactive waste per day. This amount is commercially significant. For example, a 5,000 gallon tank of radioactive waste could be eliminated in about 3 months. Pre-processing of the waste material to, for example, remove water could improve the energy economics of the systems.

The apparatus can be made portable on specially designed trucks and moved from tank to tank. This would be advantageous because the process itself leads to no significant emission and segregates the radioactive materials on substrates suitable for removal from the site. For example, the deposition stages 45 of FIG. 4, the additional deposition stages 127 of FIG. 12 as well as the limiters 27 of FIG. 2 could be made entirely of glass or ceramic. They could then be removed from the vessels automatically by crushing them and collecting the crushed materials in steel containers under vacuum.

Appropriate robotics and other considerations necessary for complying with DOE radioactive waste handling procedures will also be added to the apparatus.

The beads that are projected through the bead projector 255 of FIG. 25 can be made of ceramic or of catalyst materials and incorporated into a recovery system that is operated like a fluidized bed.

Besides radioactive waste tanks, the method could be applied to fuel rod processing. One such device could process about one ton of fuel rod per day. The vacuum processing and control of the products would be advantageous for this application also.

The invention could also be applied to chemical toxic wastes and to eliminate chemical or germ warfare weapons.

Thus, it can be seen that the ramifications are numerous, far reaching and exceedingly varied in usefulness.

TABLE 1

| NONRADIOACTIVE SPECIES | | RADIOACTIVE SPECIES | |
|---|---|---|---|
| | WGT % | | VARIOUS UNITS |
| Water | 35.0300 | Uranium | 101 microgram/gram |
| Sodium | 22.0000 | Pu 239/240 | .003 microCi/gram |
| NO2– | 11.1000 | Sr 90 | 9 microCi/gram |
| NO3– | 8.7000 | Cs 137 | 328 microCi/gram |
| Total Inorganic Carbon | 5.1000 | | |
| Total Organic Carbon | 5.1000 | Total alpha | <.03 microCi/gram |
| Aluminum | 5.5400 | Total Beta | 328 microCi/gram |
| Hydroxi ion | 2.1000 | | |
| Chlorine ion | 0.7300 | | |
| Phosphate | 0.5000 | | |
| CN | 0.0020 | | |
| Calcium | 0.1280 | | |
| Chromium | 0.2000 | | |
| Sulphate | 0.2000 | | |
| Potassium | 0.2670 | | |
| Ammonia | 0.1900 | | |
| Nickel | 0.0110 | | |
| Iron | 0.0500 | | |
| Fluorine | 0.0300 | | |
| | 96.9780 | | |

TABLE 2

| NON-RADIOACTIVE ELEMENTS | NUMBER PERCENT | RADIOACTIVE ELEMENTS | SMALL AMOUNTS |
|---|---|---|---|
| H | 41.400 | U238 | 101 micrograms/gm |
| O | 31.600 | Pu 239/240 | .003 microCi/gm |

TABLE 2-continued

| NON-RADIOACTIVE ELEMENTS | NUMBER PERCENT | RADIOACTIVE ELEMENTS | SMALL AMOUNTS |
|---|---|---|---|
| Na | 10.100 | Np 237 | small |
| N | 5.400 | Pu 238 | small |
| C | 8.900 | Am 241 | small |
| Al | 1.900 | Cm 244 | small |
| Cl | 0.200 | Se 79 | small |
| K | 0.070 | Kr 85 | small |
| Fl | 0.016 | Sr 90 | 9 microCi/gm |
| P | 0.050 | Zr 93 | small |
| Cr | 0.031 | Te 99 | small |
| Mo | 0.020 | Pd 107 | small |
| Ni | 0.020 | Sn 126 | small |
| Zn | 0.020 | I 129 | small |
| S | 0.020 | Cs 137 | 328 microCi/gm |
| Fe | 0.003 | Sm 151 | small |
| Ca | 0.033 | | |
| | 99.783 | | |

TABLE 3

SPECIES COLLECTED IN TOROIDAL CONTAINMENT VESSEL

Al
Cr
C
Mo
Ni
Fe
Ca
U238
Pu 239/240
Np 237
Pu 238
Am241
Cm244
Sr90
Zr 93
Te 99
Sn 126

TABLE 4

SPECIES COLLECTED IN ADDITIONAL CONTAINMENT VESSEL

H
O
Na
N
Cl
K
Fl
P
S
Se 79
Kr 85
I 129
Cs 137

What is claimed is:

1. A method of separating from each other a portion of species from the other species in a feedstock material comprising:

a. generating a product plasma that is composed principally of species of elements of the feedstock material by injecting said feedstock material into a volume plasma processor equipped with a toroidal containment vessel and with at least one additional containment vessel having an exhaust pipe, wherein said product plasma has a center and a surface, b. maintaining said product plasma spaced from walls said toroidal containment vessel by means of magnetic fields for a period of time over which the species of elements of said feedstock material in the center of the plasma diffuse to the surface of the plasma, c. separating a first portion of the species from the other species by repeatedly cycling all the species of the product plasma between said plasma surface and deposition stage lining the toroidal containment vessel walls such that a portion of species of elements which have high ionization probability, accumulate on said deposition stages, while other species, which have a lower ionization probability accumulate and remain in said product plasma, d. diverting said accumulated and remained product plasma, into said additional containment vessel at the end of the period of time over which the species of elements of the feedstock material from said center of the plasma diffuse to the plasma surface, e. causing the diverted plasma to move for an additional period of time along parallel magnetic fields of said additional containment vessel, such that species in the moved diverted plasma cools, recombines and lands on deposition stages lining the walls of said additional containment vessel, f. collecting landed species on deposition stages of said additional containment vessel and on louvers terminating said exhaust pipe and, g. removing from deposition stages of both vessels and louvers the separated and collected species.

2. The method of claim 1 wherein the separating of the species from each other is based on their differences in sputtering rates with different materials, further comprising heating said deposition stages with heating elements or cooling said deposition stages with cooling coils.

3. The method of claim 2 wherein the deposition stages lining said toroidal containment vessel are maintained at a temperature of 800° C. to vaporize alkali metals.

4. The method of claim 1 wherein the separation of the species from each other is based on their differences in sputtering rates with different materials, further comprising coating the deposition stages with materials that are chosen with sputtering coefficients that are higher than specific species of species of elements such that those species collect in said remainder product plasma.

5. The method of claim 1 wherein the separating of the species from each other is based on their differences in chemisorption and physisorption with different materials, further comprising coating the deposition stages with materials selected to attach specific species of species of elements more than others and accumulate those species so that they do not remain in said remainder product plasma.

6. The method of claim 1 where the species of elements in said diverted plasma cool and recombine as they move along the parallel magnetic fields of said additional containment vessel and the species are collected without further separations on cooled deposition stages.

7. The method of claim 6 where said deposition stages in said additional containment vessel are cooled to at least room temperature to collect species of alkali metals.

8. The method or claim 6 where said cooled louvers in the exhaust pipes are cooled to cryogenic temperatures to collect species of oxygen, hydrogen and nitrogen.

9. The method of claim 1 where the deposition stages are coated with glass, quartz, sapphire, ceramics, or composites.

10. A method of separating from each other a portion of species from the other species in a feedstock material comprising:

a. generating a product plasma that is composed principally of species of elements of the feedstock material by injecting said feedstock material into a volume plasma processor equipped with a toroidal containment vessel and with at least one additional containment vessel having an exhaust pipe with cooled louvers, wherein said product plasma has a surface, b. diverting said product plasma containing species of the feedstock into said additional containment vessel before any repeated cycling of the species of said product plasma between the plasma surface and the deposition stages lining the toroidal containment vessel, c. causing the diverted product plasma to move along parallel magnetic fields of said additional containment vessel, d. controlling said diverted product plasma to a temperature range from about 10,000° C. to about 50,000° C. by at least one means of radiation cooling to lower the temperature and of raising the temperature with electromagnetic wave heaters, e. separating from the diverted plasma some of the species of elements from each other on the basis of their differences in ionization potential, such that species with ionization potentials below about 8 ev are maintained in an ionized state and continue to be confined by said parallel magnetic fields, while species with ionization potential above about 8 ev recombine and lands on deposition stages lining wall of said additional containment vessel or enter said exhaust pipe and strike said cooled louvers in said exhaust pipe, f. collecting landed species on deposition stages of said additional containment vessel and on louvers terminating said exhaust pipe, and g. removing from the deposition stages and louvers the separated collected species.

11. The method of claim 10 where the electromagnetic wave heaters maintain the temperature of said product plasma between 1 and 50 ev.

12. The method of claim 10 wherein the separating of the species from each other is based on their differences in charge exchange cross sections with different atomic and molecular species comprising directing beams of said atomic and molecular species through said product plasma to cause specific species to become neutral and unconfined by the magnetic field and to strike the deposition stages in the proximity of the atomic or molecular beam.

13. The method of claim 10 wherein the separating of the species from each other is based on their different charge to mass ratios comprising using rf ponderomotive force applicators to stop parallel motion of specific species that strike the deposition stages in a proximity of the rf ponderomotive force applicator.

14. The method of claim 13 where the rf ponderomotive force applicator is an antenna.

15. A method of separating from each other a portion of species from the other species in feedstock material comprising:

a. generating a product plasma that is composed principally of species of elements of the feedstock material by injecting said feedstock material into a volume plasma processor equipped with a toroidal containment vessel and with more than one additional containment vessel, having an exhaust pipe with louvers equipped with means to separate specific species of elements from each other, wherein said product plasma has a center and a surface, b. maintaining most of said product plasma separated from said walls of said said toroidal containment vessel by magnetic fields while identifying the species of elements and their location in the product plasma by means of a spectrometer, c. choosing one of said additional containment vessels for collecting the specific species identified in an edge region of the plasma, then, d. diverting a portion of said product plasma in the edge region into at least one said additional containment vessel equipped to separate the species identified in the edge region, e. causing the diverted product plasma to move along said magnetic fields of the chosen said additional containment vessel, f. separating species in the diverted product plasma from the other species as the plasma moves along said magnetic fields of said additional containment vessel wherein the separating of the species from each other is based on their different ionization potentials, interactions, rf ponderomotive forces, or charge exchange neutralization, g. collecting said other species of said product plasma that lands on deposition stages lining walls of said additional containment vessel, and on said louvers terminating said exhaust pipes, and h. removing from the deposition stages and louvers separated collected species.

16. The method of claim 15 where the portion of said product plasma surface is diverted into said additional containment vessel at any time between 1 millisecond and the time over which species of elements of said feedstock material in the center of the plasma diffuse to the surface of the plasma.

17. The method of claim 15 where the feedstock material is inhomogeneous radioactive waste and where the spectrometer identifies regions of the product plasma initially containing levels of radioactive species content.

18. The method of claim 15 where the volume plasma processor includes at least two additional confinement vessels and when the product plasma has high concentrations of radionuclides, further comprising diverting the product plasma into one of said additional confinement vessels and when the product plasma has low concentrations of radionuclides, diverting said product plasma into the other containment vessel.

19. Apparatus which is a large volume plasma processor for separating from each other a portion of species from the other species in a feedstock material comprising:

a. a toroidal containment vessel with walls, b. a gas inlet, to supply a generating gas, c. means to create ionization in the generating gas, d. means for generating a magnetic field substantially parallel to the walls of said toroidal containment vessel and substantially filling said toroidal containment vessel, e. means for generating a toroidal current which is substantially parallel to said toroidal magnetic field and generates a magnetic field, a poloidal field, perpendicular to the toroidal field, f. means for heating the generating gas to produce a high temperature, low density ionized gas plasma with a temperature of at least 500,000° C., g. means for controlling a space between said high temperature, low density ionized gas plasma and the walls of the containment vessel, h. means for injecting a portion of the feedstock material at a velocity into said high temperature, low density ionized gas plasma, which is identified as a product plasma, i. means for rapidly increasing the heating means to overcome radiation losses, j. means for rapidly stabilizing said product plasma, to initially maintain the space between the plasma anti the containment vessel walls, k. means for moving a portion of said product plasma, across said space between the plasma and the containment vessel walls to deposit the ionized and unionized species of elements in the feedstock material on deposition stages lining the walls of the containment vessel, l. means for modifying the magnetic field by the addition of diverting magnetic fields to move the plasma into more than one additional containment vessels lined with deposition stages, and m. means for removing the deposited species from deposition stages.

20. The apparatus of claim 19 where the other containment vessel is an elongated evacuated container and is surrounded by magnetic field generating coils which produce magnetic fields that are parallel to the long axis or said elongated evacuated container and substantially guide the diverted said product plasma species of the elements of the feedstock material said product plasma the walls of said elongated evacuated container.

21. The apparatus of claim 19 where the additional containment vessels are equipped with means for heating the plasma with electromagnetic wave heaters, with means for stopping parallel motion of some species with rf ponderomotive force applicators, with molecular beam projectors means and with bead projectors means.

22. The apparatus of claim 19 wherein the toroidal containment vessel has a major radius of between 60 cm and 300 cm and a minor radius of between 20 cm and 200 cm.

* * * * *